US008589259B2

(12) United States Patent
Kunieda et al.

(10) Patent No.: US 8,589,259 B2
(45) Date of Patent: Nov. 19, 2013

(54) PURCHASING TRANSACTION SUPPORT SYSTEM

(75) Inventors: Shigetoshi Kunieda, Kawasaki (JP); Syuichi Tsujimoto, Yokohama (JP); Naoki Watanabe, Tokyo (JP); Yasuhiro Ono, Kawasaki (JP); Toru Okada, Tokyo (JP); Kazuya Nambu, Fujimino (JP)

(73) Assignee: Toshiba Tec Kabushiki Kaisha (JP)

( * ) Notice: Subject to any disclaimer, the term of this patent is extended or adjusted under 35 U.S.C. 154(b) by 1126 days.

(21) Appl. No.: 12/074,560

(22) Filed: Mar. 4, 2008

(65) Prior Publication Data

US 2008/0222001 A1 Sep. 11, 2008

(30) Foreign Application Priority Data

Mar. 5, 2007 (JP) ................................. 2007-054836

(51) Int. Cl.
*G06Q 30/00* (2012.01)
*G07B 17/00* (2006.01)
*G07F 19/00* (2006.01)

(52) U.S. Cl.
USPC ............ 705/30; 705/26.1; 705/27.1; 705/346

(58) Field of Classification Search
None
See application file for complete search history.

(56) References Cited

U.S. PATENT DOCUMENTS

| | | | | |
|---|---|---|---|---|
| 6,484,097 | B2 * | 11/2002 | Fuchs et al. | 701/471 |
| 7,308,356 | B2 * | 12/2007 | Melaku et al. | 701/533 |
| 7,634,445 | B1 * | 12/2009 | Langer et al. | 705/40 |
| 2003/0144793 | A1 * | 7/2003 | Melaku et al. | 701/209 |

FOREIGN PATENT DOCUMENTS

| | | |
|---|---|---|
| JP | 09-160977 | 6/1997 |
| JP | 2000-184087 | 6/2000 |
| JP | 2001-312507 | 11/2001 |
| JP | 2001-350982 | 12/2001 |
| JP | 2002-157540 | 5/2002 |
| JP | 2002-183006 | 6/2002 |
| JP | 2002-245384 | 8/2002 |
| JP | 2003-050957 | 2/2003 |
| JP | 2003-077064 | 3/2003 |
| JP | 2003-102875 | 4/2003 |
| JP | 2003-108835 | 4/2003 |

(Continued)

OTHER PUBLICATIONS

Communication mailed Jan. 6, 2009 (with translation) from Japanese Patent Office re: related application No. 2006-143075.

(Continued)

*Primary Examiner* — Paul Danneman
(74) *Attorney, Agent, or Firm* — Harness, Dickey & Pierce, P.L.C.

(57) ABSTRACT

A portable communication terminal requests merchandise information from a store management apparatus, by using store identity information about a store where a purchasing transaction is made, and merchandise information about merchandise to be purchased. The store management apparatus has a merchandise information storage configured to store merchandise information including a price of merchandise to be sold in each store. The store management apparatus receives a merchandise information request from a portable communication terminal, retrieves a merchandise information storage, detects merchandise information matching a retrieval condition, and sends the merchandise information to the request source, i.e., the portable communication terminal. The portable communication terminal displays merchandise information sent from the store management apparatus in a display.

10 Claims, 31 Drawing Sheets

(56) References Cited

FOREIGN PATENT DOCUMENTS

| JP | 2003-187112 | 7/2003 |
| JP | 2003-196541 | 7/2003 |
| JP | 2003-256514 | 9/2003 |
| JP | 2004-102875 | 4/2004 |
| JP | 2004-310755 | 11/2004 |
| JP | 2004-318504 | 11/2004 |
| JP | 2005-141649 | 6/2005 |
| JP | 2005-332134 | 12/2005 |
| JP | 2006-031655 | 2/2006 |
| JP | 2006-504163 | 2/2006 |
| JP | 2006-99484 | 4/2006 |
| JP | 2006-209243 | 8/2006 |

OTHER PUBLICATIONS

Communication (with translation) from Japanese Patent Office re: related application dated Apr. 24, 2008.
Communication (with translation) from Japanese Patent Office regarding related application No. 2006-143074 dated Oct. 28, 2008.
Communication (with translation) from Japanese Patent Office regarding related application No. 2007-054837 dated Oct. 10, 2008.
Communication mailed Oct. 14, 2008 (with translation) from Japanese Patent Office re related application No. 2007-054836.

* cited by examiner

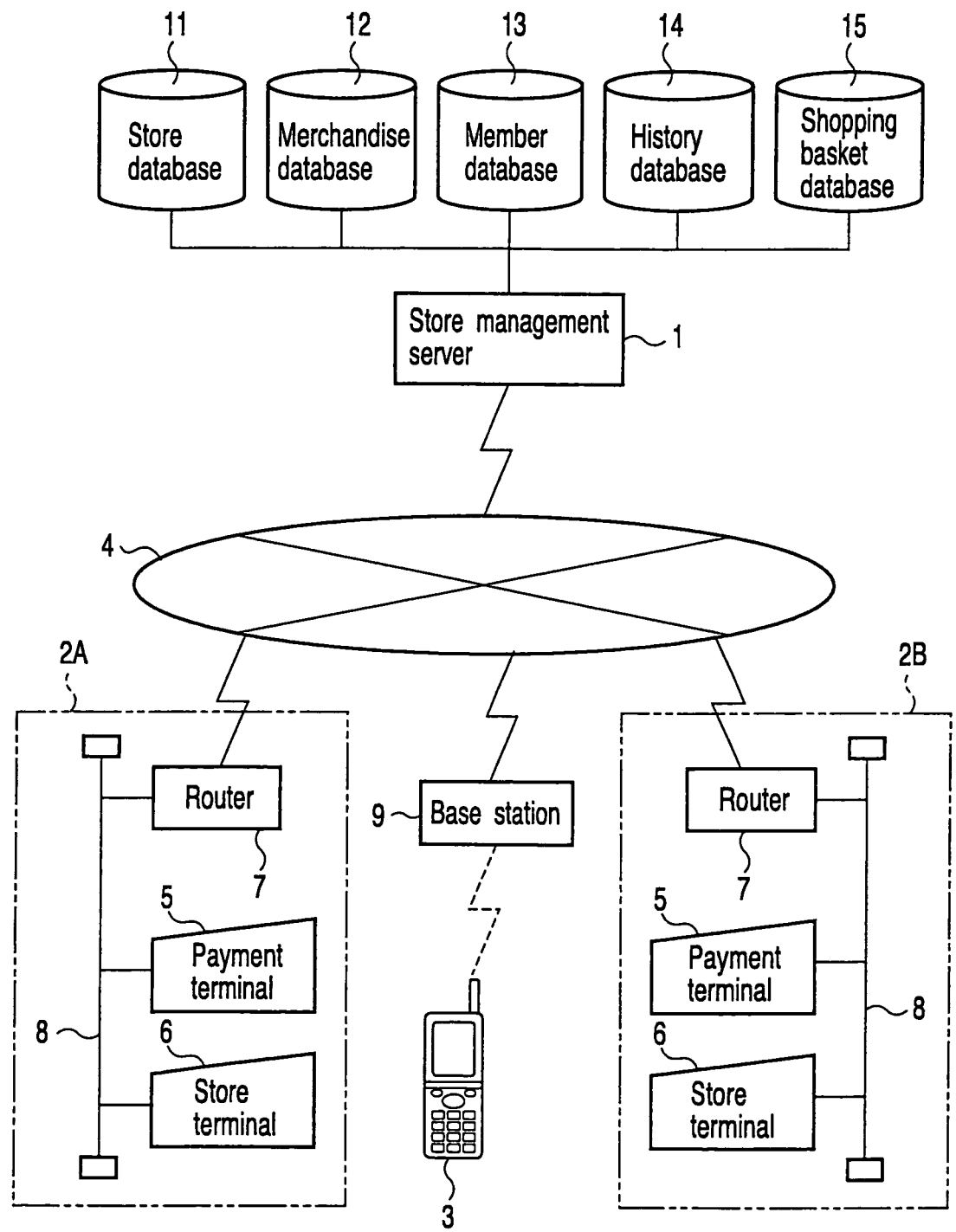
F I G. 1

11

| Store code | Store name | Address | Latitude / longitude | Merchandise database No. |
|---|---|---|---|---|
| S00001 | AA store | | zzzz/zzzz | IDB001 |
| S00002 | BB store | | zzzz/zzzz | IDB002 |
| S00003 | CC store | | zzzz/zzzz | IDB003 |
| ⋮ | ⋮ | ⋮ | ⋮ | ⋮ |

| Merchandise database No. | IDB001 | | |
|---|---|---|---|
| Merchandise code | Merchandise name | Unit price | Sales promotion information |
| 4900⋯⋯ | Merchandise AAA | 150 | None |
| 4900⋯⋯ | Merchandise BBB | 200 | None |
| 4900⋯⋯ | Merchandise CCC | 200 | In campaign |
| ⋮ | ⋮ | ⋮ | ⋮ |

T1

| Merchandise database No. | IDB001 | | |
|---|---|---|---|
| Merchandise code | Merchandise name | Unit price | Sales promotion information |
| 4900⋯⋯ | Merchandise AAA | 150 | None |
| 4900⋯⋯ | Merchandise BBB | 180 | In campaign |
| 4900⋯⋯ | Merchandise CCC | 230 | None |
| ⋮ | ⋮ | ⋮ | ⋮ |

| Member code | Member name | Personal information | Payment information | History database No. | Basket database No. |
|---|---|---|---|---|---|
| K00001 | AAA | ……… | 111… | PDB001 | 0 |
| K00002 | BBB | ……… | 222… | PDB002 | CDB001 |
| K00003 | CCC | ……… | 333… | PDB003 | 0 |
| ⋮ | ⋮ | ⋮ | ⋮ | ⋮ | ⋮ |

| History database No. | PDB001 | | |
|---|---|---|---|
| Shopping date | Store code | Store name | Purchased merchandise information |
| 20070201 | S00001 | AA store | Merchandise code, quantity, unit price, etc. |
| 20070202 | S00001 | AA store | Merchandise code, quantity, unit price, etc. |
| 20070202 | S00002 | BB store | Merchandise code, quantity, unit price, etc. |
| ⋮ | ⋮ | ⋮ | ⋮ |

T2

| History database No. | PDB999 | | |
|---|---|---|---|
| Shopping date | Store code | Store name | Purchased merchandise information |
| 20070201 | S00007 | GG store | Merchandise code, quantity, unit price, etc. |
| 20070203 | S00006 | FF store | Merchandise code, quantity, unit price, etc. |
| 20070204 | S00002 | BB store | Merchandise code, quantity, unit price, etc. |
| ⋮ | ⋮ | ⋮ | ⋮ |

| Basket database No. | CDB001 | | | | |
|---|---|---|---|---|---|
| Store code | S00001 | | | | |
| Store name | AA store | | | | |
| Shopping date | 20070210 | | | | |
| Shopping time | Merchandise code | Merchandise name | Unit price | Quantity | Amount |
| 14:01 | 4900⋯⋯ | Merchandise AAA | 150 | 1 | 150 |
| 14:03 | 4900⋯⋯ | Merchandise CCC | 200 | 2 | 300 |
| 14:04 | 4900⋯⋯ | Merchandise EEE | 400 | 1 | 400 |
| | | | | | |
| | | | Total | 4 | 850 |

T3 {

| Basket database No. | CDB002 | | | | |
|---|---|---|---|---|---|
| Store code | S00002 | | | | |
| Store name | BB store | | | | |
| Shopping date | 20070210 | | | | |
| Shopping time | Merchandise code | Merchandise name | Unit price | Quantity | Amount |
| 14:02 | 4900⋯⋯ | Merchandise AAA | 145 | 1 | 145 |
| 14:04 | 4900⋯⋯ | Merchandise FFF | 100 | 2 | 200 |
| 14:04 | 4900⋯⋯ | Merchandise GGG | 200 | 2 | 400 |
| | | | | | |
| | | | Total | 5 | 785 |

FIG. 6

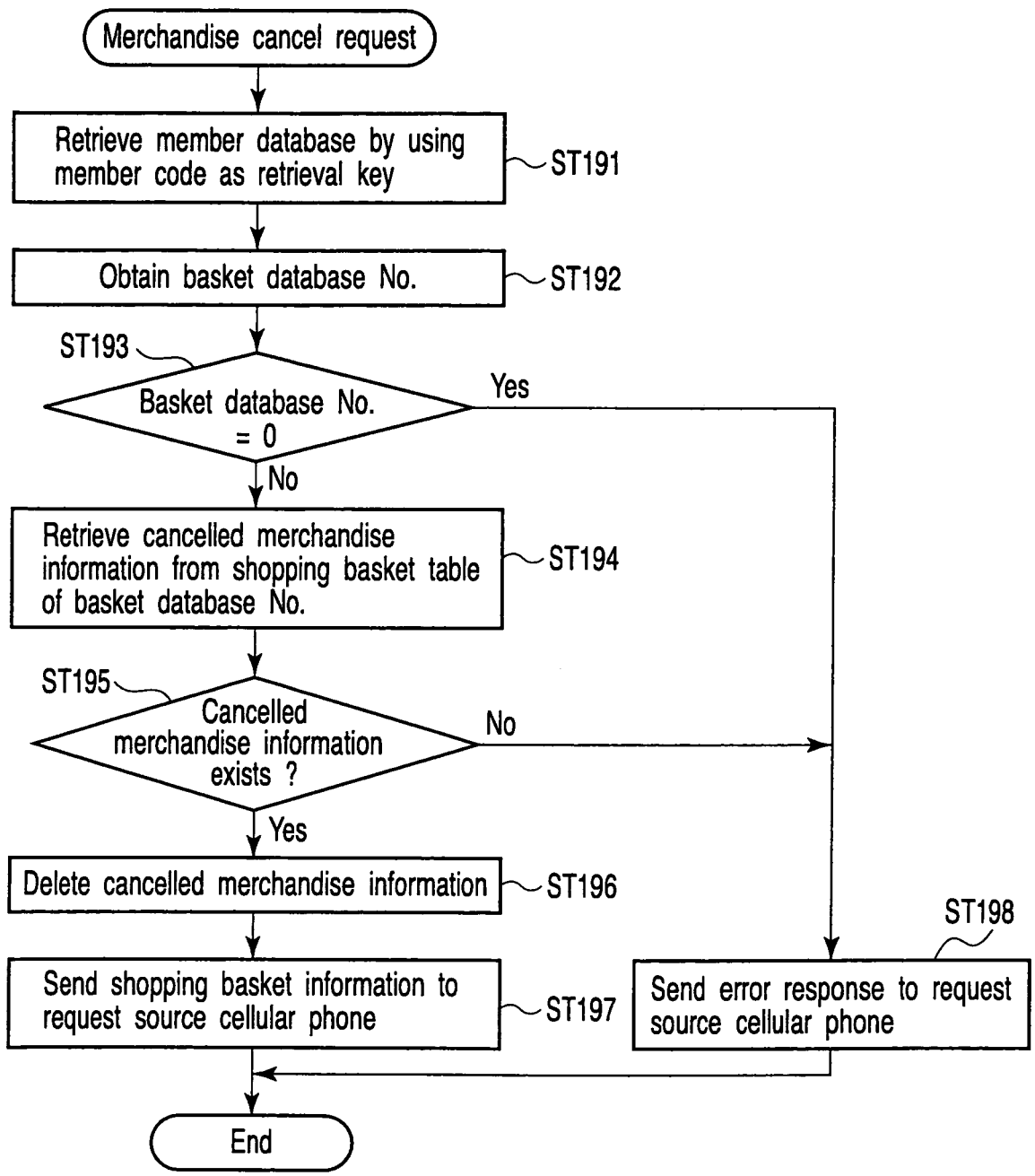
F I G. 27

PURCHASING TRANSACTION SUPPORT SYSTEM

CROSS-REFERENCE TO RELATED APPLICATIONS

This application is based upon and claims the benefit of priority from prior Japanese Patent Application No. 2007-054836, filed Mar. 5, 2007, the entire contents of which are incorporated herein by reference.

BACKGROUND OF THE INVENTION

1. Field of the Invention

The present invention relates to a purchasing transaction support system, which supports a purchasing transaction made by a customer at a physical retail store by using a portable communication terminal. A portable communication terminal is a cellular phone, a microcellular phone, a personal digital assistant, etc.

2. Description of the Related Art

Jpn. Pat. Appln. KOKAI Publication No. 2000-184087 discloses an electronic shopping system using a cellular phone. This system uses a cellular phone provided with a downloaded purchasing transaction program. A purchasing transaction program is downloaded from a seller's server to a cellular phone. A cellular phone is provided with a program loader.

A customer searches merchandise in a virtual store by means of, for example, a cellular phone. If desired merchandise is found, the customer purchases the merchandise. The customer pays for the purchased merchandise through the cellular phone.

In a conventional electronic shopping system, when the customer selects merchandise through a cellular phone, a server sends information about the merchandise, such as a price and explanation to the customer's cellular phone. The merchandise information is displayed in the cellular phone. Therefore, the customer can confirm information on merchandise before buying the merchandise. However, this system covers only one store, and merchandise information sent from a server to a cellular phone is limited to one kind for one item of merchandise.

It is also desired that the customer makes a purchasing transaction at a physical retail store by using a portable communication terminal. Namely, the customer visits a physical retail store, and searches merchandise in the store by operating a portable communication terminal. If desired merchandise is found, the customer makes a request to purchase the merchandise. The customer pays for the purchased merchandise through a portable communication terminal.

However, prices of merchandise and service contents are different in physical retail stores. Therefore, it is necessary to build up a system capable of supplying the customer's portable communication terminal with correct information on the merchandise sold in a store where the customer is actually shopping. For this purpose, a store must be identified through a portable communication terminal, before the customer searches merchandise.

BRIEF SUMMARY OF THE INVENTION

It is an object of the invention to provide a system, which is configured to support a purchasing transaction by supplying a portable communication terminal of a customer with correct information about merchandise sold in a store where the customer is actually shopping. It is another object of the invention to provide a store management apparatus and a portable radio terminal used in the system.

According to an aspect of the invention, there is provided a purchasing transaction support system comprising a plurality of portable communication terminal, and a store management apparatus which receives a request from a portable communication terminal through a network, and executes the request, wherein a portable communication terminal comprises a store identity information storage configured to store information to identify a store; an input unit configured to input merchandise identity information to identify merchandise to be purchased; a merchandise information request unit configured to request merchandise information from the store management apparatus through the network by using the merchandise identity information and store identity information as retrieval conditions; a store information receiving unit configured to receive information sent from the store management apparatus through the network; and a merchandise information display configured to display merchandise information, when the store information receiving unit receives the merchandise information.

The store management apparatus comprises a merchandise information storage configured to store merchandise information including a price of merchandise sold at each store; a terminal request receiving unit configured to receive a request from the portable communication terminal through the network; a merchandise information detector configured to retrieve the merchandise information storage, and detect merchandise information about merchandise identified by merchandise identity information included in the merchandise information request, including a price in a store identified by the store identity information included in the request, each time the terminal request receiving unit receives the request; and a merchandise information sending unit configured to send the merchandise information detected by the merchandise information detector, to the request source portable communication terminal through the network.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic diagram of a purchasing transaction support system according to an embodiment of the invention;

FIG. 2 is a diagram showing the structure of data stored in a store database in the embodiment;

FIG. 3 is a diagram showing the structure of data stored in a merchandise database in the embodiment;

FIG. 4 is a diagram showing the structure of data stored in a member database in the embodiment;

FIG. 5 is a diagram showing the structure of data stored in a history database in the embodiment;

FIG. 6 is a diagram showing the structure of data stored in a shopping basket database in the embodiment;

FIG. 27 is a flowchart showing the procedure of a merchandise cancel request command receiving process executed by a control unit of a store management server, in the same embodiment;

DETAILED DESCRIPTION OF THE INVENTION

Figure 7:
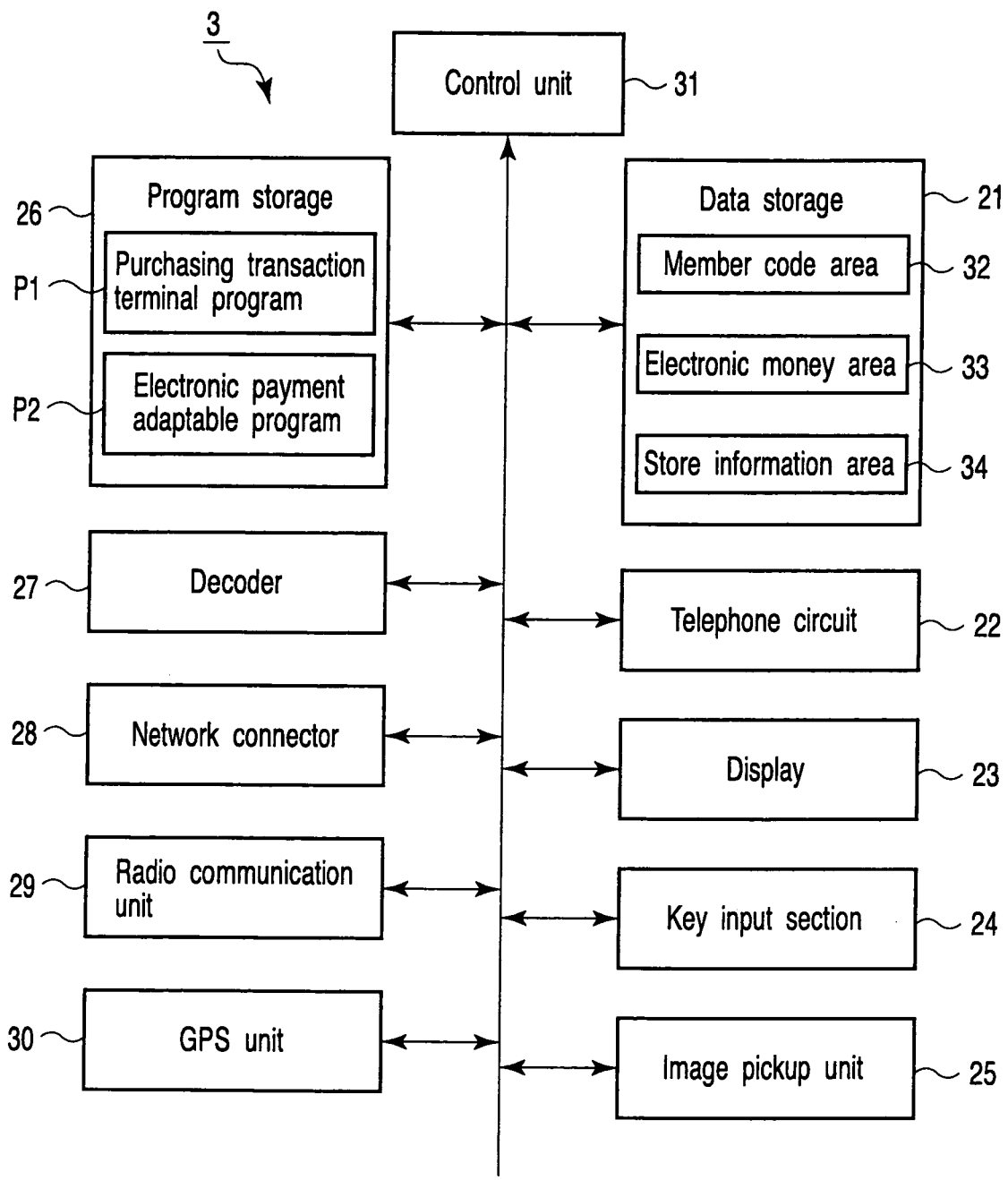
FIG. 7 is a block diagram showing main components of a cellular phone in the embodiment.

A best embodiment of the invention will be explained hereinafter with reference to the accompanied drawings. This embodiment uses a digital cellular phone as a portable communication terminal.

First, an explanation will be give on the configuration of a purchasing transaction support system according to this embodiment.

FIG. 1 is a schematic diagram of a purchasing transaction support system. This system includes a store management server 1, and store systems 2A and 2B. The store management server 1 is provided in a main office to provide a purchasing transaction support service. The store systems 2A and 2B are built up in a physical retail store affiliated to the purchasing transaction support service.

The store management server 1 is connected to a wide-area network 4, such as the Internet or Integrated Services Digital Network (ISDN). The network 4 is connected to a router 7 of each store system 2A/2B, and a base station 9 of a portable communication terminal 3. A cellular phone 3 serves as a portable communication terminal used by a customer who is a member of the purchasing transaction support service, when making a purchasing transaction.

The store system 2A/2B consists of a payment terminal 5, a store terminal 6, and a router 7. The payment terminal 5, store terminal 6 and router 7 are connected to an in-store Local Area Network (LAN) 8. The payment terminal 5 and store terminal 6 can transfer data with the store management server 1 on the network 4 through the router 7. The number of payment terminal 5 and store terminal 6 is not limited.

The store management server 1 has a function as a database server. A database managed by the store management server includes a store database 11, a merchandise database 12, a member database 13, a history database 14, and a shopping basket database 15. These databases 11-15 are incorporated in the store management server 1. These databases 11-15 may be externally connected to the store management server 1.

The store database 11 stores information about each store, i.e., a store code, a store name, an address, a latitude and longitude of address, and a merchandise table number, as shown in FIG. 2. The store code is a unique code previously set for each store to identify each store. The merchandise table number is a number set in a merchandise data table T1 of each store specified by a corresponding store code.

The merchandise database 12 stores a merchandise data table T1 of each store, as shown in FIG. 3. In each merchandise data table T1, a unique table number is set. A merchandise data table T1 of one store stores a merchandise code, a merchandise name, a unit price, and sales promotion information about merchandise sold in that store. A merchandise code is merchandise identity information previously set for each merchandise to identify each merchandise. A merchandise code is also called a PLU code or a single article code. A unit price is a selling price of each merchandise item specified by a corresponding merchandise code in a store.

The member database 13 stores information about each member, i.e., a member code, a member name, personal information (address, telephone number, etc.), payment information, a history table number, and a basket table number, as shown in FIG. 4. A member code is a unique code previously set for each member to identify each member. Payment information is a credit card company name or number used for payment by a member specified by a corresponding member code. A history table number is a number set in a history data table T2 of a member specified by a corresponding member code. A basket table number is a number set in a shopping basket table T3 of a member specified by a corresponding member code.

The history database 14 stores a history data table T2 for each member, as shown in FIG. 5. Each history data table T2 is given a unique table number. A history data table T2 of one member stores a shopping date, a store code, a store name, and purchased merchandise information (merchandise code, purchased quantity, unit price, etc.).

The shopping basket database 15 stores more than one shopping basket table T3, as shown in FIG. 6. Each shopping basket table T3 is given a unique table number. One shopping basket table T3 stores information to identify a purchasing transaction, information about purchased merchandise, and total information about shopping. The information to identify a purchasing transaction includes a store code, a store name, and a shopping date. The information about purchased merchandise includes shopping time, a merchandise code, a merchandise name, a unit price, a quantity, and an amount. The total information about shopping includes total quantity and total amount of purchased merchandise.

FIG. 7 is a block diagram showing main components of a cellular phone 3. The cellular phone 3 comprises a data storage 21, a telephone circuit 22, a display 23, a key input section 24, an image pickup unit 25, a program storage 26, a decoder 27, a network connector 28, a radio communication unit 29, a Global Positioning System (GPS) unit 30, and a control unit 31. The control unit 31 controls the data storage 21, telephone circuit 2, display 23, key input section 24, image pickup unit 25, program storage 26, decoder 27, network connector 28, radio communication unit 29, and GPS unit 30.

The data storage 21 includes a member code area 32, an electronic money area 33, and a store information area 34. The member code area 32 stores a member code of a member using the cellular phone 3. The electronic money area 33 stores the balance of electronic money used for electronic payment. The store information area 34 stores a store code of a store where a purchasing transaction is performed. The data of these areas 32-34 is held even after the cellular phone 3 is turned off.

The telephone circuit 22, display 23, key input section 24, and image pickup unit 25 are well-known devices mounted in an existing cellular phone with a camera.

The program storage 26 saves various application programs to be executed by the control unit 31. These programs include a purchasing transaction terminal program P1, and an electronic payment adaptable program P2. The purchasing transaction terminal program P1 is an application program for functioning the cellular phone 3 as a purchasing transaction device. The electronic payment adaptable program P2 is an application program for processing electronic payment using electronic money.

The purchasing transaction terminal program P1 is downloaded to the cellular phone 3 from the store management server 1 through the network 4, on condition that the user of the cellular phone 3 earns membership in the purchasing transaction support service. A method of downloading the purchasing transaction terminal program P1 to the cellular phone 3 is not limited to this. For example, in a cellular phone having a USB interface, the program P1 may be downloaded from a personal computer through a USB cable.

The decoder 27 decodes a barcode or a two-dimensional data code picked up by the image pickup unit 25. The network connector 28 connects the network 4 by communicating with the base station 9. The radio communication unit 29 performs short-range radio communication by using a communication method, such as infrared communication and radio-frequency identification (RFID). The GPS unit 30 receives a radio wave from a GPS satellite, and calculates a latitude and longitude of a present location.

Figure 8:
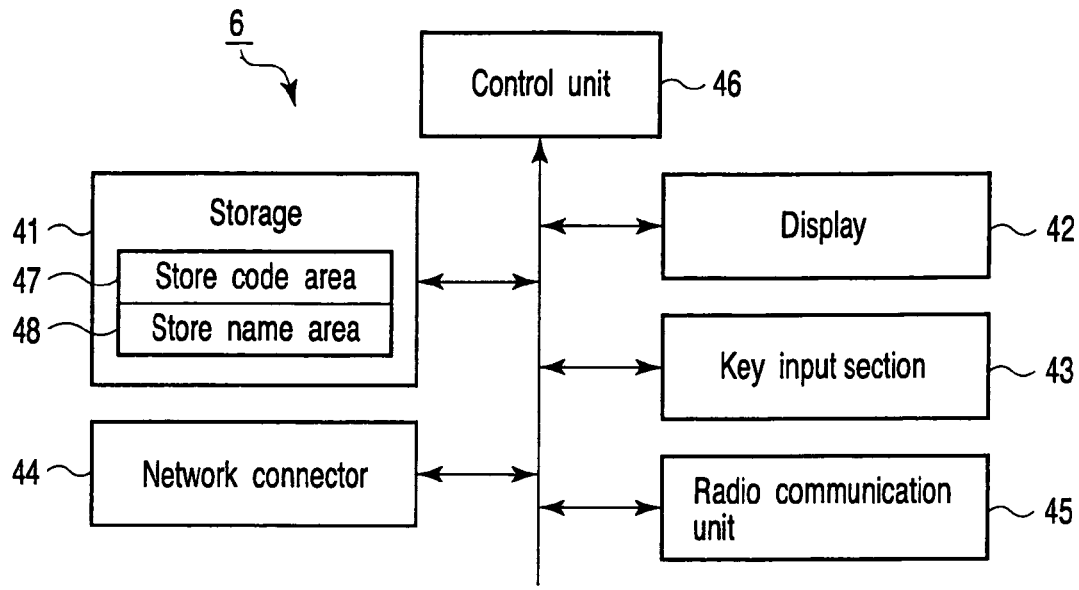
FIG. 8 is a block diagram showing main components of a store terminal in the embodiment.

FIG. 8 is a block diagram showing main components of a store terminal 6. The store terminal 6 comprises a storage 41, a display 42, a key input section 43, a network connector 44, a radio communication unit 45, and a control unit 46. The control unit 46 controls the storage 41, display 42, key input section 43, network connector 44, and radio communication unit 45.

The storage 41 includes a store code area 47, and a store name area 48. The store code area 47 stores a store code set uniquely for a store provided with the store terminal 6. The store name area 48 stores a name of such a store. The data of these areas 47 and 48 are held even after the store terminal 6 is turned off.

The display 42 and key input section 43 are well-known devices mounted in an existing store terminal. The network connector 44 connects the network 4 through the router 7.

The radio communication unit 45 transfers data with the radio communication unit 29 of the cellular phone 3 by a close-range radio wave. For example, a store information request command is received from the cellular phone 3, store identity information such as a store code and name stored in the areas 47 and 48 is sent to the request command source, i.e., the cellular phone 3.

Figure 9:
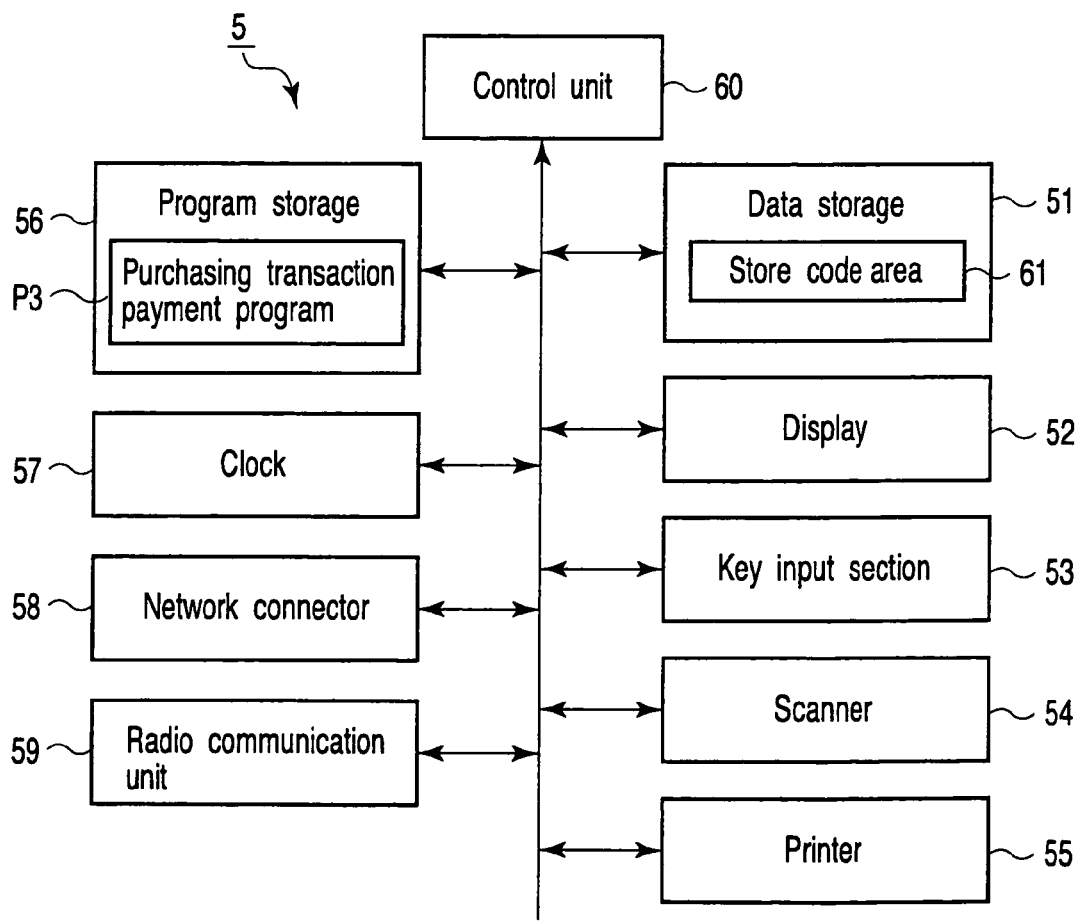
FIG. 9 is a block diagram showing main components of a payment terminal in the embodiment.

FIG. 9 is a block diagram showing main components of a payment terminal 5. The payment terminal 5 comprises a data storage 51, a display 52, a key input section 53, a scanner 54, a printer 55, a program storage 56, a clock 57, a network connector 58, a radio communication unit 59, and a control unit 60. The control unit 60 controls the data storage 51, display 52, key input section 53, scanner 54, printer 55, program storage 56, clock 57, network connector 58, radio communication unit 59.

The data storage 51 includes a store code area 61. The store code area 61 stores a store code set uniquely for a store provided with the payment terminal 5. The data of this area 61 is held even after the payment terminal 5 is turned off.

The display 52, key input section 53, scanner 54 and printer 55 are well-known devices mounted in an existing point-of-sales (POS) terminal.

The program storage 56 saves various application programs to be executed by the control unit 60. These programs include a purchasing transaction payment program P3. The purchasing transaction payment program P3 is an application program for executing payment for a purchasing transaction using the cellular phone 3.

The clock 57 counts a present date and time. The network connector 58 connects the network 4 through the router 7. The radio communication unit 59 transfers data with the radio communication unit 29 of the cellular phone 3 by a short-range radio wave.

Figure 10:
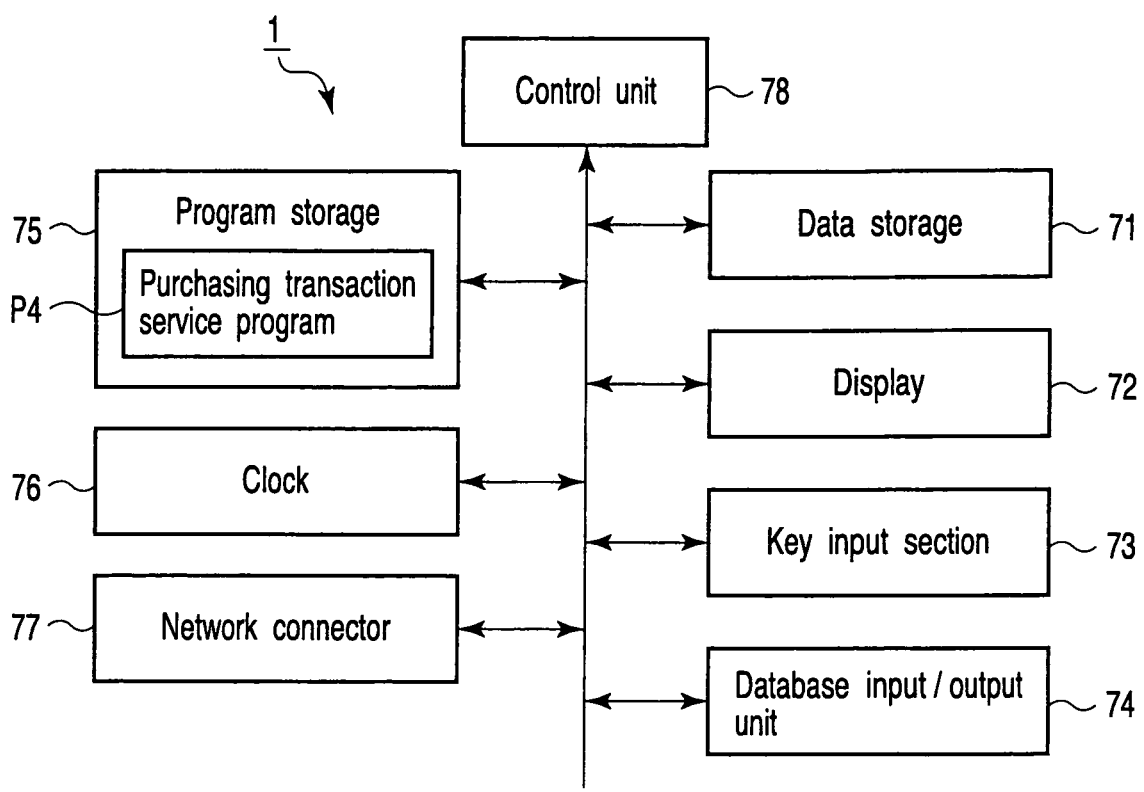
FIG. 10 is a block diagram showing main components of a store management server in the embodiment.

FIG. 10 is a block diagram showing main components of a store management server 1. The store management server 1 comprises a data storage 71, a display 72, a key input section 73, a database input/output unit 74, a program storage 75, a clock 76, a network connector 77, and a control unit 78. The control unit 78 controls the data storage 71, display 72, key input section 73, database input/output unit 74, program storage 75, clock 76, and network connector 77.

The data storage 71 includes areas for storing various data. The data stored in these areas is held even after the store management server 1 is turned off.

The display 72 and key input section 73 are well-known devices mounted in an existing server computer.

The database input/output unit 74 reads and writes data for each database to be managed. The clock 76 counts a present date and time. The network connector 77 connects the network 4.

The program storage 75 saves various application programs to be executed by the control unit 78. These programs include a purchasing transaction service program P4. The purchasing transaction service program P4 is an application program for supporting a purchasing transaction and payment using the cellular phone 3.

Next, an explanation will be given on the operation of the purchasing transaction support system according to this embodiment.

Figure 11:
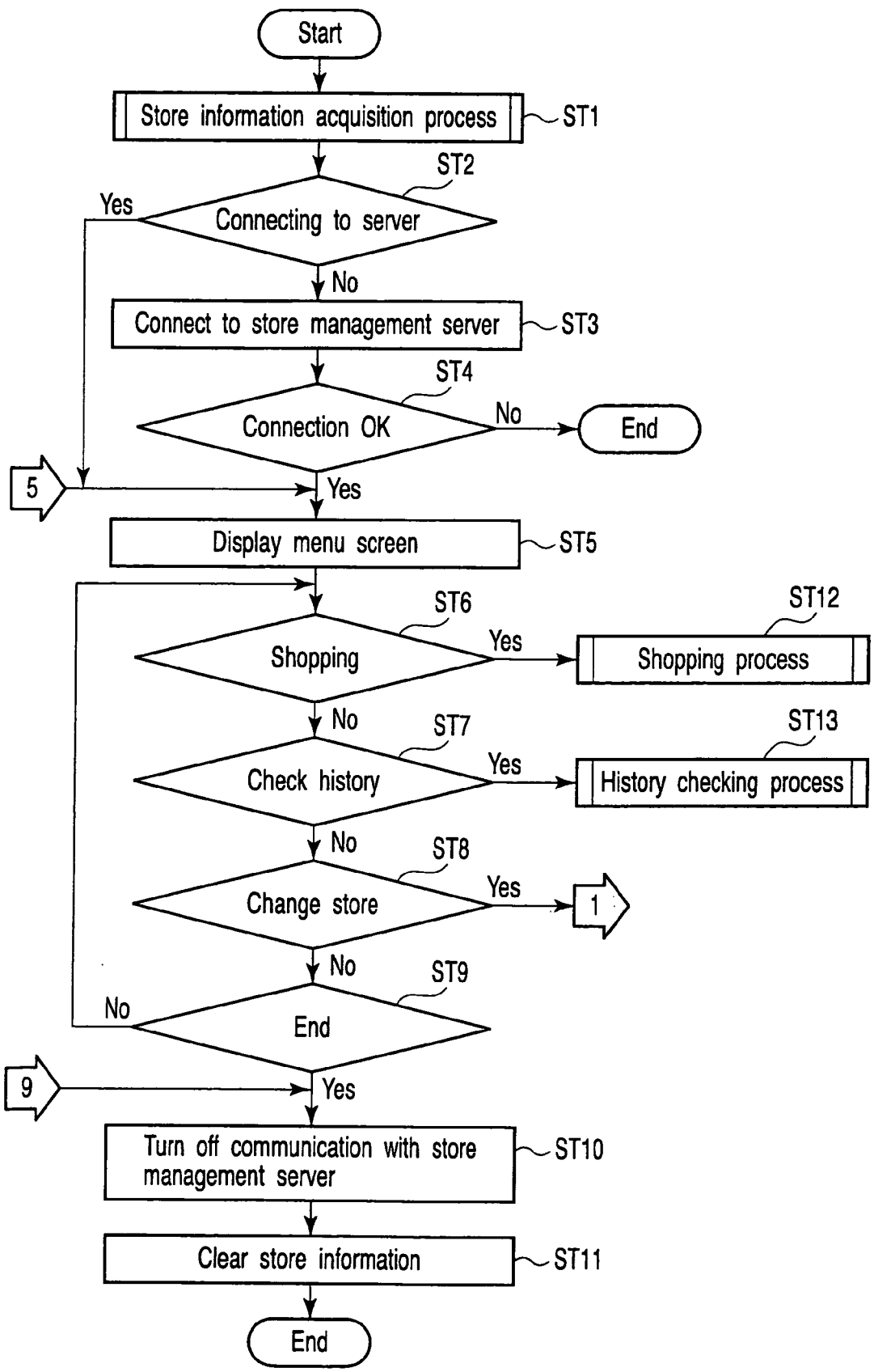
FIG. 11 is a flowchart showing the procedure of a main process executed by a control unit of a cellular phone, according to a purchasing transaction terminal program.

First, the user of the cellular phone 3 commands start of a purchasing transaction by operating the key input section 24. Then, the purchasing transaction terminal program P1 is started in the cellular phone 3. The control unit 31 of the cellular phone 3 starts the processing shown in the flowchart of FIG. 11.

The control unit 31 starts a store information acquisition process to specify a physical retail store where a purchasing transaction is made (step ST1). The store information acquisition process is concretely shown in the flowcharts of FIGS. 12-15.

The control unit 31 judges whether store information is stored in the store information area 34 of the data storage 21 (step ST21). Store information consists of a store code and a store name. If store information is stored in the store information area 34 (YES in step ST21), a store information acquisition process is finished.

Figure 33:
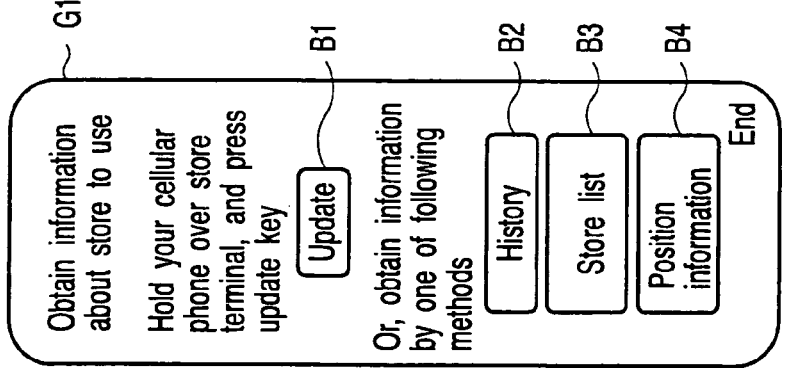
FIG. 33 is a diagram showing an example of a store information acquisition screen appeared in a display of a cellular phone, in the same embodiment.

If store information is not stored in the store information area 34 (NO in step ST21), the control unit 31 displays a store information acquisition screen G1 on the display 23 (step ST22). FIG. 33 shows an example of the store information acquisition screen G1. As shown in FIG. 33, the store information acquisition screen G1 has an "Update" button B1, a "History" button B2, a "Store List" button B3, and a "Position Information" button B4. The user can command, "End" on this screen G1.

The control unit 31 waits for depression of any one of the buttons, or selection of "End" (steps ST23-ST27). If the user selects "End" by operating the key input section 24 (YES in step ST23), the purchasing transaction terminal program P1 is finished.

If the "Update" button B1 is pressed (YES in step ST27), the control unit 31 controls the radio communication unit 29, and sends a store information request command to the store terminal 6 (step ST28). At this time, when the radio communication unit 29 of the cellular phone 3 is held over the radio communication unit 45 of the store terminal 6, the store terminal 6 receives the request command. Receiving the store information request command, the store terminal 6 sends store information, such as a store code and a store name stored in the areas 47 and 48, back to the cellular phone 3.

After sending the store information request command, the control unit 31 of the cellular phone 3 waits for store information. Receiving the store information from the store terminal 6 through the radio communication unit 29 (YES in step ST29), the control unit 31 stores the received store information in the store information area 34 (step ST30). This terminates the store information acquisition process.

If no store information is received from the store terminal 6 (NO in step ST29), the control unit 31 waits again until any one of the buttons is pressed on the store information acquisition screen G1, or "End" is selected.

Figure 13:
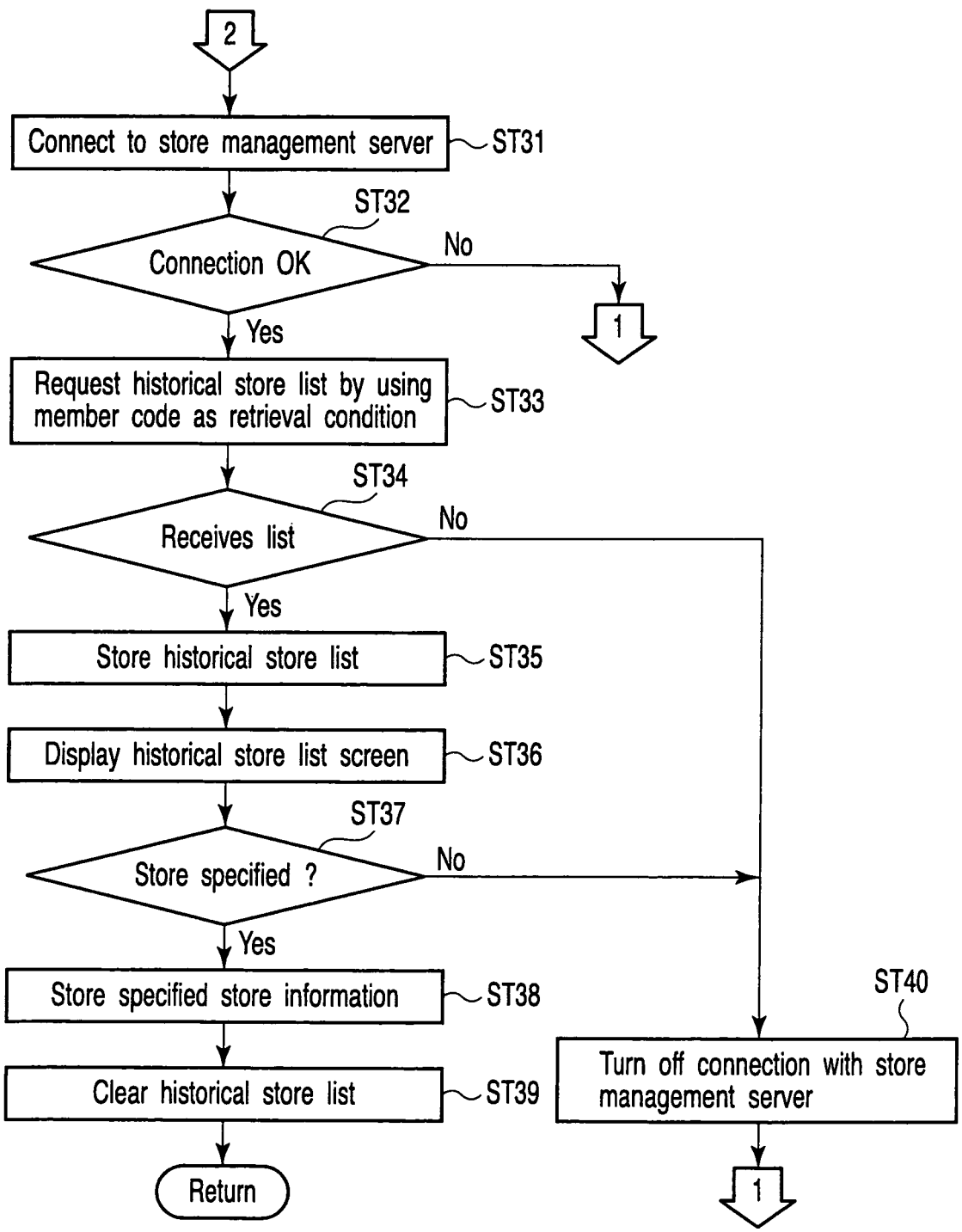
FIG. 13 is a flowchart showing the concrete procedure of a process after depression of a "History" button in FIG. 12.

If the "History" button B2 is pressed on the store information acquisition screen G1 (YES in step ST24), the control unit 31 starts the processing shown in the flowchart of FIG. 13.

First, the control unit connects a circuit to the store management server 1 by operating the network connector 28. If the circuit is not connected (NO in step ST32), the control unit 31 returns to step ST22, and displays the store information acquisition screen G1 on the display 23.

If a circuit is connected to the store management server 1 (YES in step ST32), the control unit 31 generates a historical store list request command (step ST33). This command includes a member code stored in the member code area 32, as a retrieval condition. The control unit 31 sends this request command to the store management server 1 through the network 4.

Figure 21:
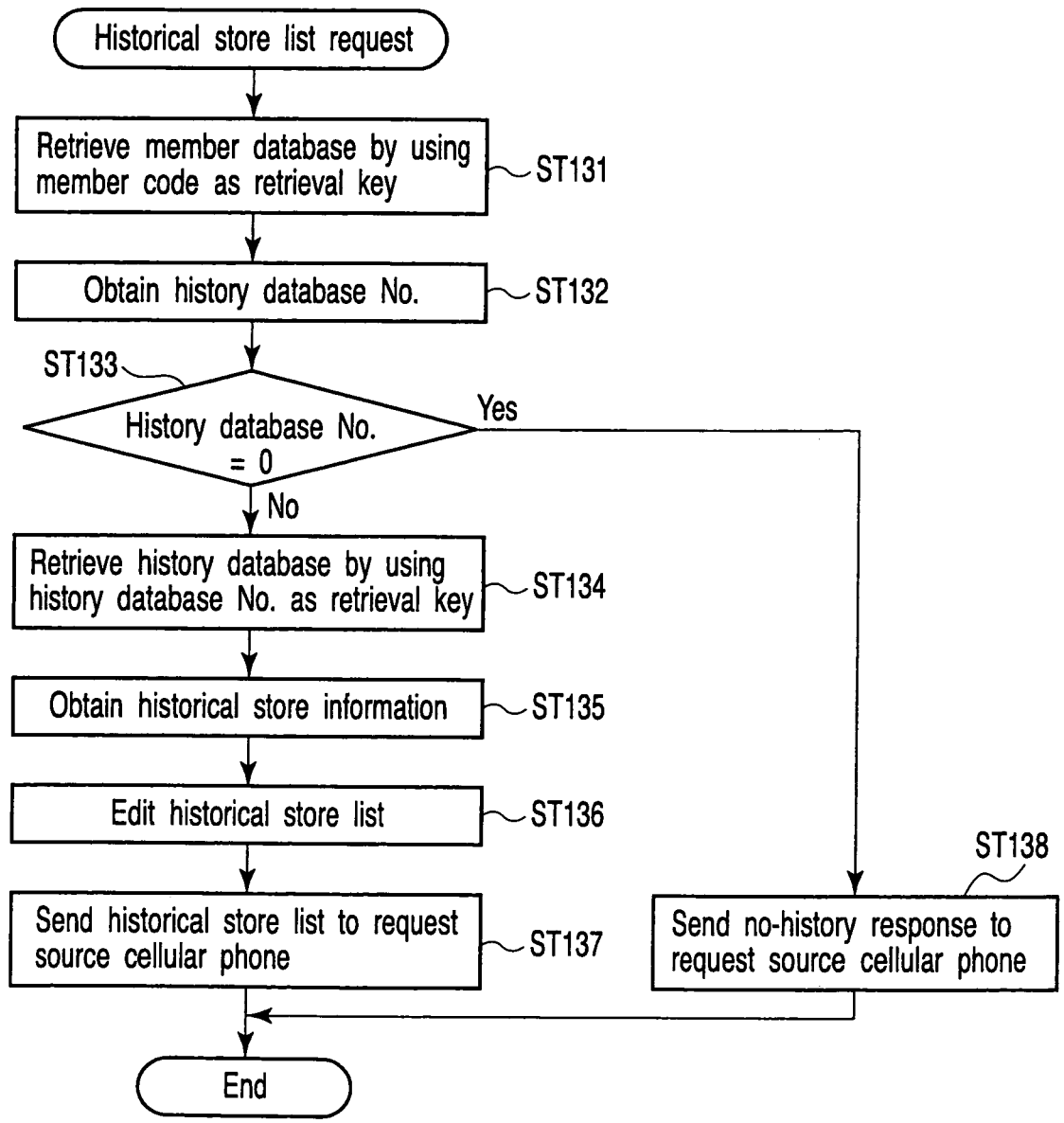
FIG. 21 is a flowchart showing the procedure of a historical store list request command receiving process executed by a control unit of a store management server, in the same embodiment.

In the store management server 1, the purchasing transaction service program P4 resides all times. Therefore, receiving the above request command, the control unit 78 of the store management server 1 starts the processing shown in the flowchart of FIG. 21.

First, the control unit 78 retrieves the member database 13 by using a member code included in the received command as a retrieval key (step ST131) and obtains a history table number from a record of a member code matching the retrieval key (step ST132).

Next, the control unit 78 judges whether the history table number is zero or not (step ST133). If the history table number is not zero, the control unit 78 retrieves the history database 14 by using that history table number as a retrieval key (step ST134). Then, the control unit obtains all information about a store, such as a store code and a store name, from the history data table T2 in which a history table number matching the retrieval key is set (step ST135).

Next, the control unit 78 edits a historical store list from the store information obtained from the history data table T2, by eliminating overlapped store codes and names (step ST136). Then, the control unit sends the data of this historical store list to the request command source, i.e., the cellular phone 3 through the network 4.

If the history table number is zero (YES in step ST133), there is no data of recorded purchasing transaction for the member of that member code. In this case, the control unit 78 sends a no-history response back to the request command source, i.e., the cellular phone 3 (step ST138).

The control unit 31 of the cellular phone 3 requests a historical store list from the store management server 1, and waits for a response (step ST34). If a historical store list is received from the store management server 1 through the network 4 (YES in step ST34), the control unit 31 stores the data of this historical store list in the data storage 21 (step ST35). The control unit displays a historical store list screen G2 on the display 23, based on the data of this historical store list (step ST36).

Figure 34:
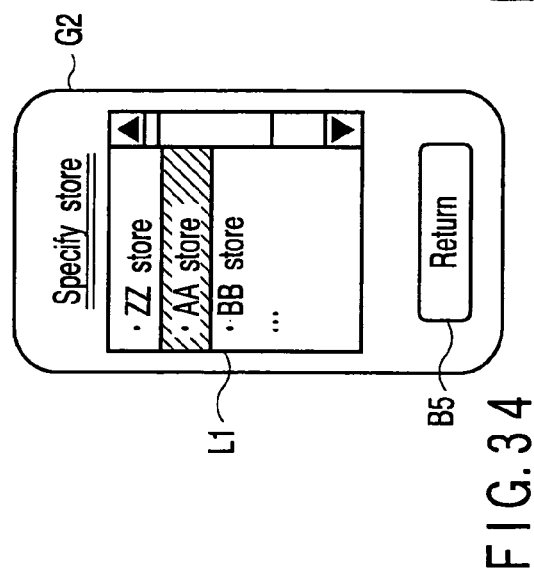
FIG. 34 is a diagram showing an example of a historical store list screen appeared in a display of a cellular phone, in the same embodiment.

FIG. 34 shows an example of the historical store list screen G2. As shown in FIG. 34, the historical store list screen G2 displays a store name list L1 and a "Return" button B5. A store name displayed in the list L1 is a store from which the user of the cellular phone 3 used a purchasing transaction service in the past.

The control unit 31 waits for selection one of the store names in the list L1 (step ST37). If any one store name is selected by operating the key input section 24 (YES in step ST34), the control unit 31 stores the selected store name and a corresponding store code in the store information area 34 (step ST38).

Then, the control unit 31 clears the data of the historical store list stored in the data storage 21 (step ST39). This completes the store information acquisition process. At this time, the cellular phone 3 is kept connected to the store management server 1.

If no response is obtained from the store management server 1 after requesting a historical store list (NO in step ST34), the control unit 31 turns off the line to the store management server 1 (step ST40). If the "Return" button B5 is pressed on the historical store list screen G2 (NO in step ST37), the control unit also turns off the line to the store management server 1. Then, the control unit returns to step ST22, and displays the store information acquisition screen G1 on the display 23.

Figure 14:
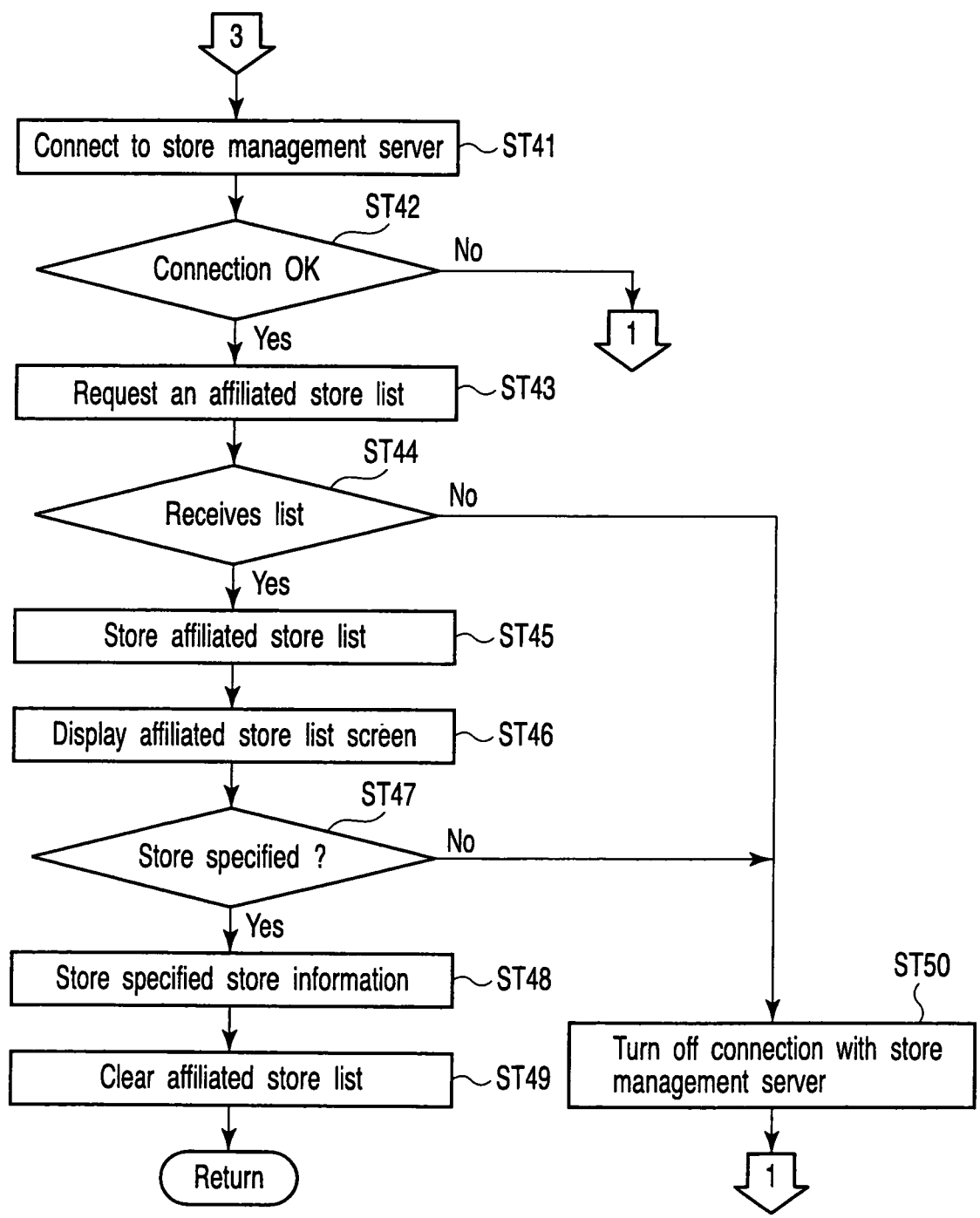
FIG. 14 is a flowchart showing the concrete procedure of a process after depression of a "Store List" button in FIG. 12.

If the "Store List" button B3 is pressed on the store information acquisition screen G1 (YES in step ST25), the control unit 31 starts the processing shown in the flowchart of FIG. 14.

First, the control unit 31 connects a circuit to the store management server 1 by operating the network connector 28 (step ST41). If a circuit is not connected (NO in step ST32), the control unit 31 returns to step ST22, and displays the store information acquisition screen G1 on the display 23.

If a circuit is connected to the store management server 1 (YES in step ST42), the control unit 31 generates an affiliated store list request command (step ST43) and sends this request command to the store management server 1.

Figure 22:
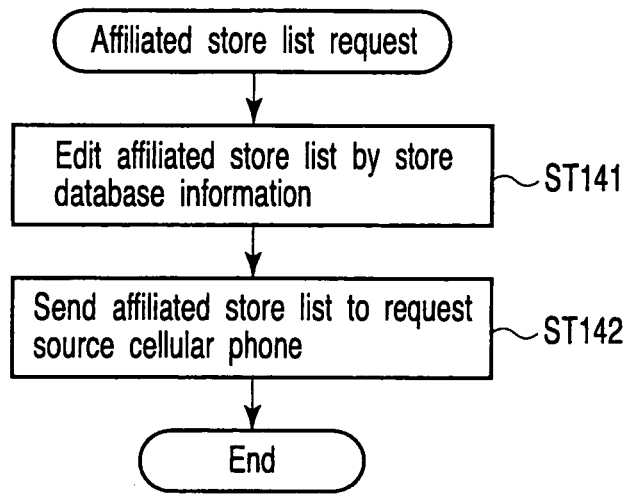
FIG. 22 is a flowchart showing the procedure of an affiliated store list request command receiving process executed by a control unit of a store management server, in the same embodiment.

In the store management server 1, the purchasing transaction service program P4 resides all times. Therefore, receiving the above request command, the control unit 78 of the store management server 1 starts the processing shown in the flowchart of FIG. 22.

First, the control unit 78 obtains all information about a store, such as a store code, a store name and an address, from the store database 11 (step ST141). Next, the control unit 78 edits a list of affiliated stores by these data. Then, the control unit 78 sends the data of this list of affiliated stores to the request command source, i.e., the cellular phone 3 through the network 4.

The control unit 31 of the cellular phone 3 requests a list of affiliated stores from the store management server 1, and waits for a response (step ST44). When the list of affiliated stores is received from the store management server 1 through the network 4, the control unit 31 stores the data of this list of affiliated stores in the data storage 21 (step ST45). The control unit 31 sequentially displays affiliated store list screens G3-G5 on the display 23, based on the data of this list of affiliated stores (step ST46).

Figure 35:
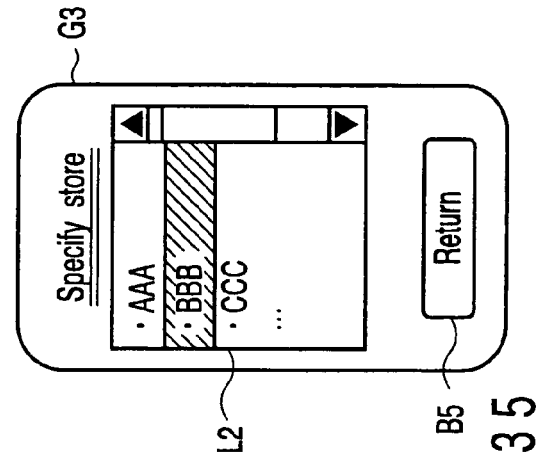
FIG. 35 is a diagram showing an example of a first-stage affiliated store list screen appeared in a display of a cellular phone, in the same embodiment.
Figure 37:
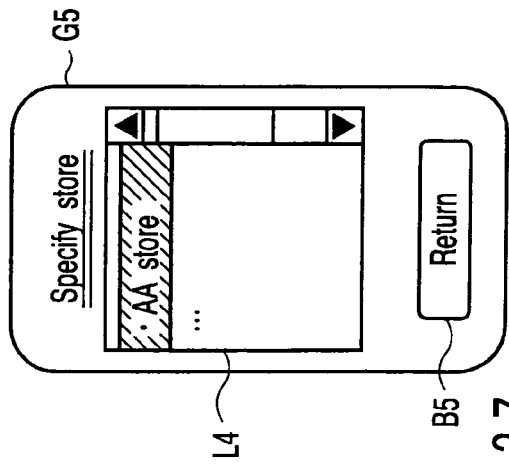
FIG. 37 is a diagram showing an example of a third-stage affiliated store list screen appeared in a display of a cellular phone, in the same embodiment.
Figure 36:
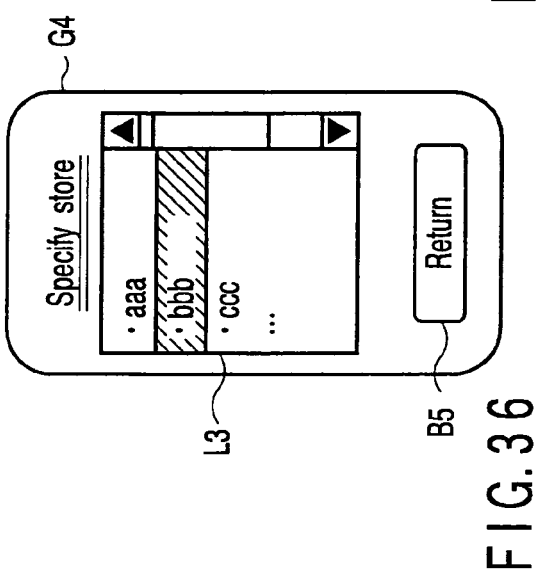
FIG. 36 is a diagram showing an example of a second-stage affiliated store list screen appeared in a display of a cellular phone, in the same embodiment.

FIGS. 35-37 show examples of the affiliated store list screens G3-G5. The affiliated store list screen G3 is an initial screen. The affiliated store list screen G3 displays a large area list L2. If any one of the large areas is selected by operating the key input section 24, the screen is switched to an affiliated store list screen G4 as a second step. The affiliated store list screen G4 displays a small area list L3 including areas divided from the selected large area. If any one of the small areas is selected by operating the key input section 24, the screen is switched to an affiliated store list screen G5 as a third step. The affiliated store list screen G5 displays a store name list L4 including stores existing in the selected small area.

All screens G3-G5 have a "Return" button B5. If the "return button" B5 is pressed on the screen G5, the screen is switched back to the screen G4. If the "Return" button B5 is pressed on the screen G4, the screen is switched back to the screen G3.

The control unit 31 waits for selection of any one of the stores in the store name list L4 (step ST47). If any one store is selected by operating the key input section 24, the control unit 31 stores the selected store name and a corresponding store code in the store information area 34 (step ST48).

Then, the control unit 31 clears the data of the affiliated store list stored in the data storage 21 (step ST49). This completes the store information acquisition process. At this time, the cellular phone 3 is kept connected to the store management server 1.

If no response is obtained after requesting a list of affiliated stores from the store management server 1 (NO in step ST44), the control unit 31 turns off the line to the store management server 1 (step ST50). If the "Return" button B5 is pressed on the affiliated store list screen G3 (NO in step ST47), the control unit also turns off the line to the store management server 1. Then, the control unit returns to step ST22, and displays the store information acquisition screen G1 on the display 23.

Figure 15:
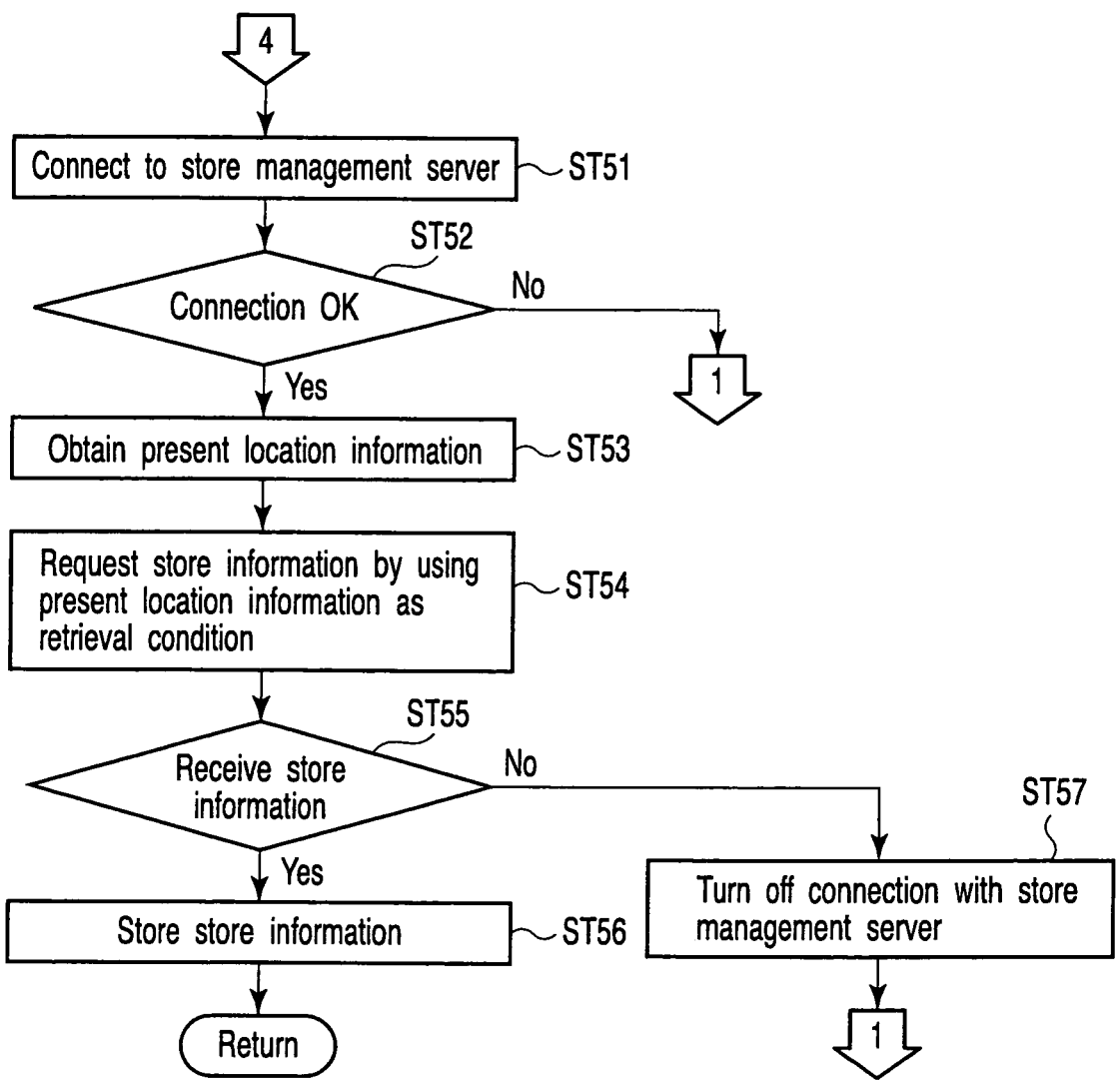
FIG. 15 is a flowchart showing the concrete procedure of a process after depression of a "Position Information" button in FIG. 12.

If the "Position Information" button B4 is pressed on the store information acquisition screen G1 (YES in step ST26), the control unit 31 starts the processing shown in the flowchart of FIG. 15.

First, the control unit 31 connects a circuit to the store management server 1 by operating the network connector 28 (step ST51). If no circuit is connected (NO in step ST52), the control unit 31 returns to step ST22, and displays the store information acquisition screen G1 on the display 23.

If a circuit is connected to the store management server 1 (YES in step ST52), the control unit 31 obtains a latitude and longitude of a present location by operating the GPS unit 30 (step ST53).

Next, the control unit 31 generates a store information request command (step ST54). This command includes the present location information obtained by the GPS unit 30 as a retrieval condition. The control unit 31 sends this request command to the store management server 1 through the network 4.

Figure 23:
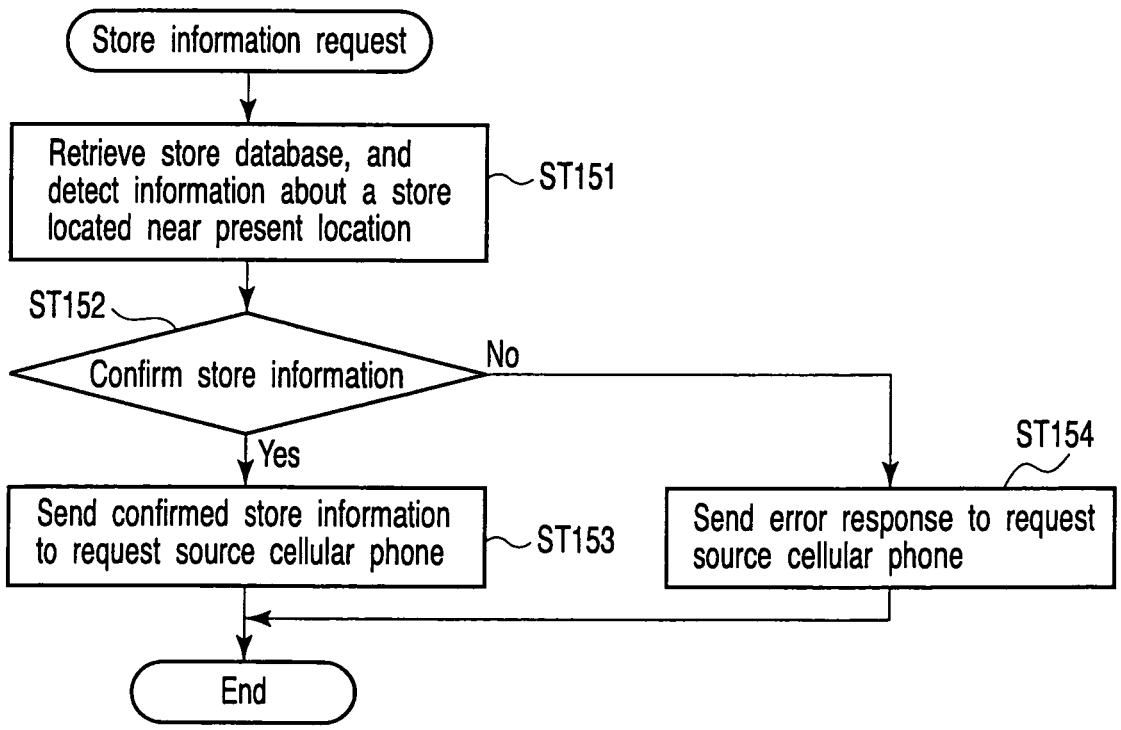
FIG. 23 is a flowchart showing the procedure of a store information request command receiving process executed by a control unit of a store management server, in the same embodiment.

In the store management server 1, the purchasing transaction service program P4 resides all times. Therefore, receiving the above request command, the control unit 78 of the store management server 1 starts the processing shown in the flowchart of FIG. 23.

First, the control unit 78 retrieves the store database 11 by using the present location information included in the received command as a retrieval key (step ST151) and detects a store whose latitude and longitude are within a predetermined error range and error is minimum.

The detected store is a store nearest to a present location. After detecting a store nearest to a present location (YES in step ST152), the control unit 78 sends the information about this store consisting of a store name and code to the request command source, i.e., the cellular phone 3 through the network 4 (step ST153).

If no nearest store is detected (NO in step ST152), the control unit 78 sends an error response command to the request command source, i.e., the cellular phone 3 through the network 4 (step ST154).

The control unit 31 of the cellular phone 3 requests store information from the store management server 1, and waits for a response (step ST55). If store information is received from the store management server 1 through the network 4 (YES in step ST55), the control unit 31 stores this store information in the store information area 34 (step ST56). This completes the store information acquisition process. At this time, the cellular phone 3 is kept connected to the store management server 1.

If no response is obtained after requesting store information from the store management server 1 (NO in step ST55), the control unit 31 turns off the line to the store management server 1 (step ST57). Then, the control unit returns to step ST22, and displays the store information acquisition screen G1 on the display 23.

When store information is obtained by any one of the above three procedures of obtaining store information, the control unit 31 judges whether a circuit is connected to the store management server 1 (step ST2). If a circuit is connected, the control unit goes to step ST5.

If a circuit is not connected to the store management server 1, the control unit 31 connects a circuit to the store management server 1 by operating the network connector 28 (step ST3). If a circuit is connected (YES in step ST4), the control unit 31 goes to step ST5.

If a circuit is not connected (NO in step ST4), the purchasing transaction terminal program P1 is finished. At this time, the store information obtained by the preceding store information acquisition process is kept stored in the store information area 34. Therefore, when the purchasing transaction terminal program P1 is next activated, the control unit 31 goes to step ST2 by passing through the store information acquisition process.

Figure 38:
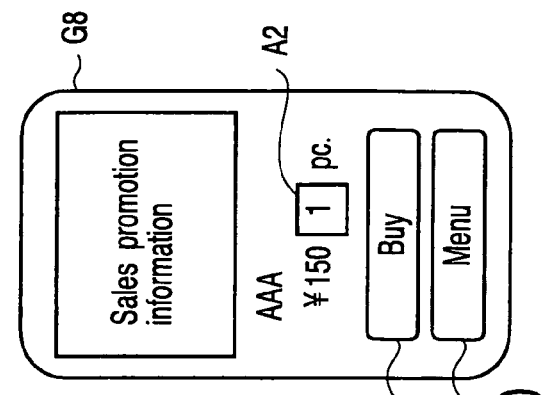
FIG. 38 is a diagram showing an example of a menu screen appeared in a display of a cellular phone, in the same embodiment.

In step ST5, the control unit 31 displays a menu screen G6 on the display 23. FIG. 38 shows an example of the menu screen G6. As shown in FIG. 38, the menu screen G6 has a "Shopping" button B6, a "History Check" button B7, and a "Store Information Change" button B8. The menu screen displays store names stored in the store information area 34. The menu screen permits the user to select "End".

The control unit 31 waits for depression of any one of the buttons, or selection of "End" (steps ST6-ST9). If "End" is selected by operating the key input section 24 (YES in step ST9), the control unit 31 turns off the line to the store management server 1 (step ST10) and clears the store information from the store information area 34 (step ST11). This completes the purchasing transaction terminal program P1.

Figure 12:
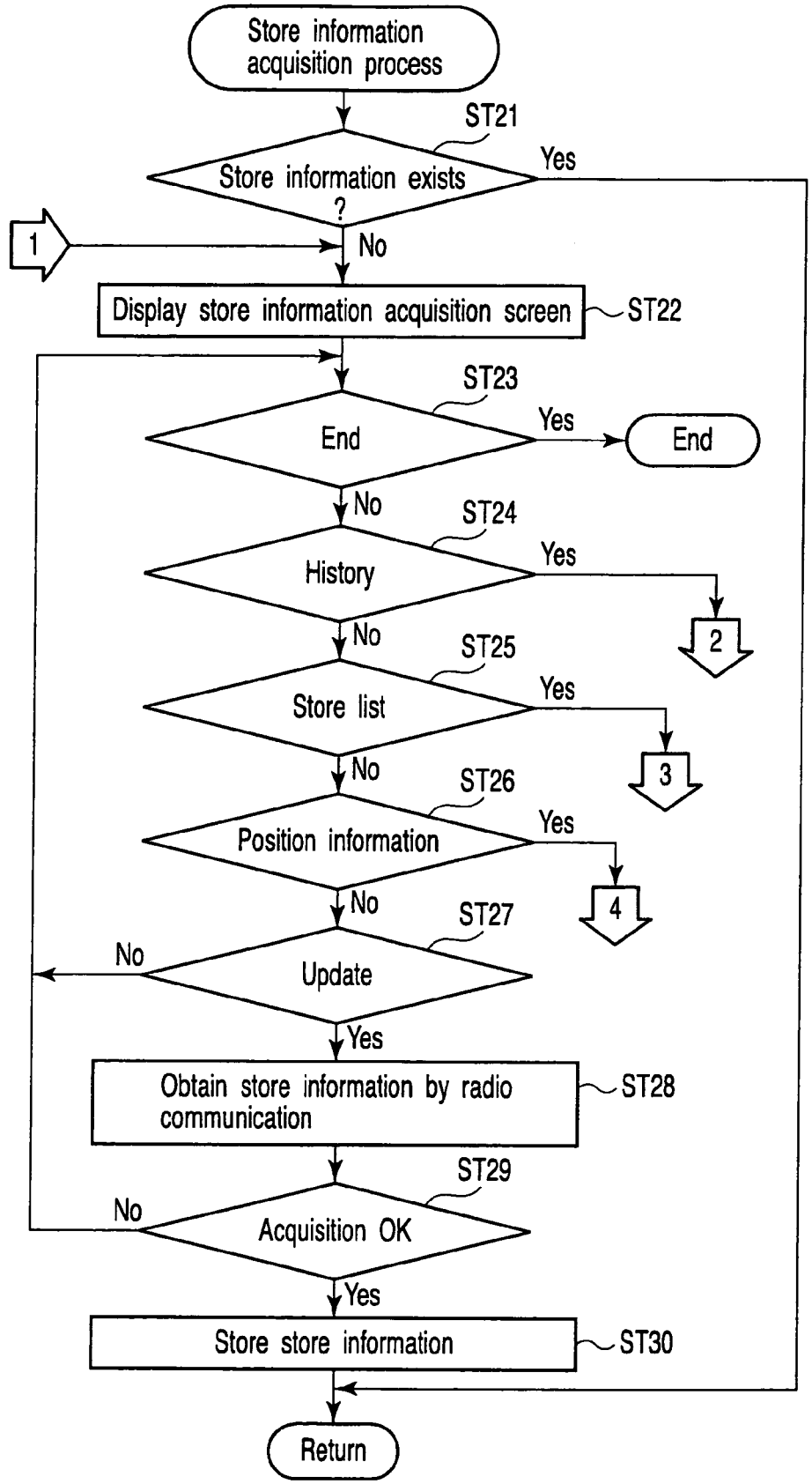
FIG. 12 is a flowchart showing the concrete procedure of a store information acquisition process in FIG. 11.

If the "Store Change" button B8 is pressed (YES in step ST8), the control unit 31 goes to step ST22 of FIG. 12. Namely, the control unit 31 displays the store information acquisition screen G1 on the display 23. Thereafter, the control unit executes the above-mentioned store information acquisition process.

Figure 16:
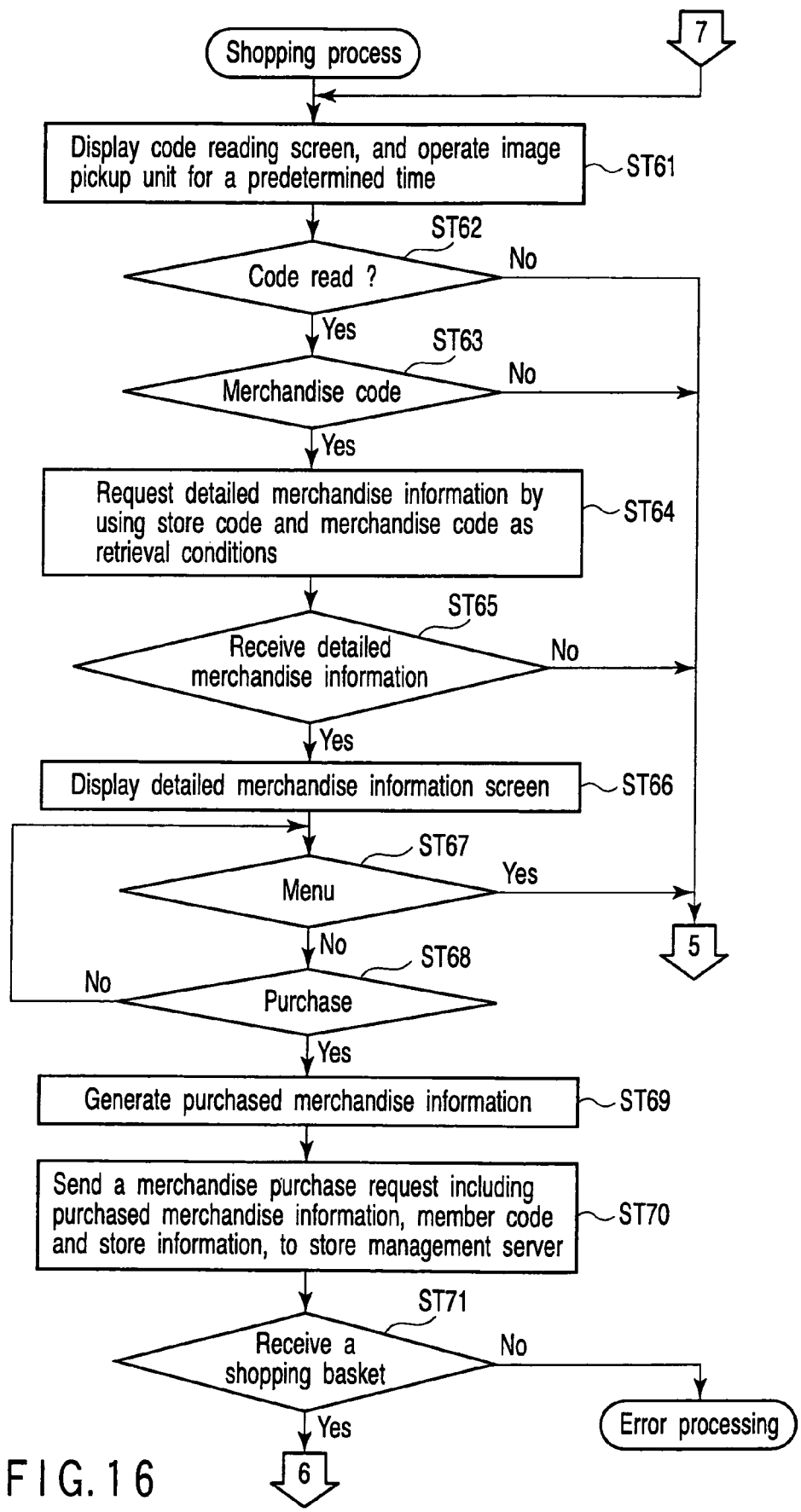
FIG. 16 is a flowchart showing the former half procedure of a shopping process in FIG. 11.
Figure 17:
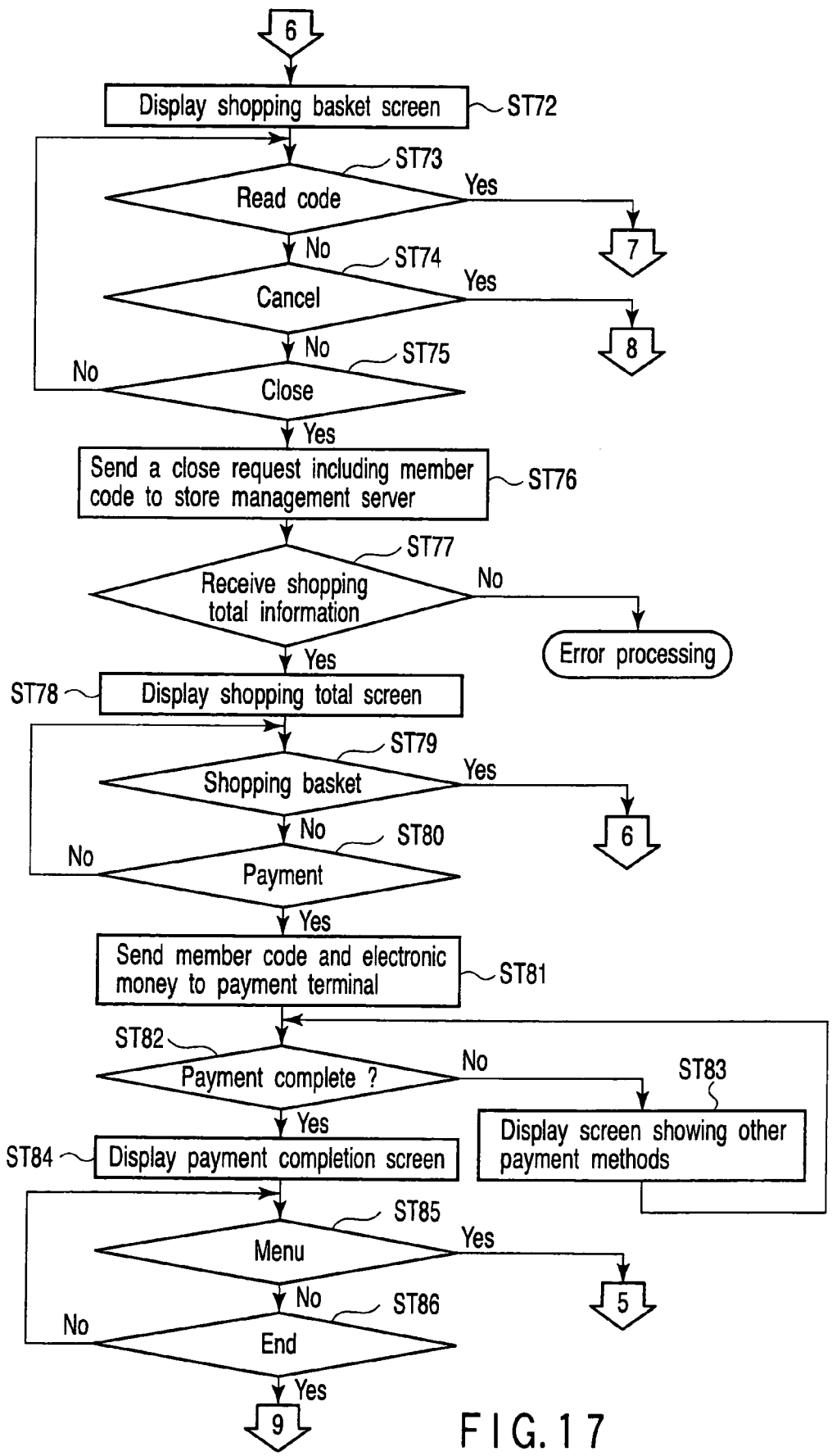
FIG. 17 is a flowchart showing the latter half of a shopping procedure in FIG. 11.
Figure 18:
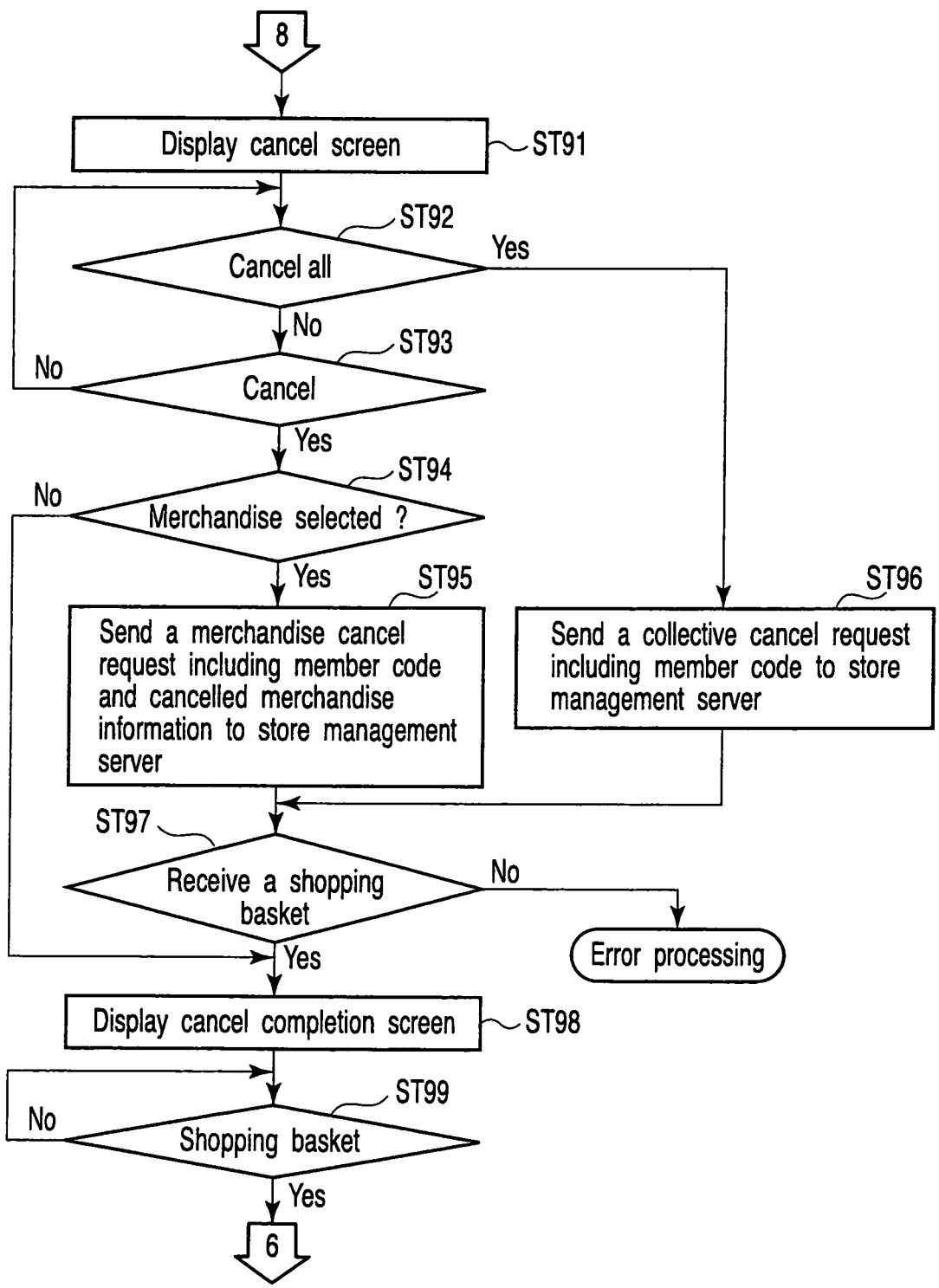
FIG. 18 is a flowchart showing the concrete procedure after depression of a "Cancel" button in FIG. 17.

If the "Shopping" button B6 is pressed on the menu screen G6 (YES in step ST6), the control unit 31 starts a shopping process (step ST12). This process is concretely shown in the flowcharts of FIGS. 16-18.

Namely, the control unit 31 displays a code read screen G7 on the display 23 (step ST61) and lets the image pickup unit 25 read a code for a certain time. The image pickup unit 25 can read a bar code or a two-dimensional data code.

Figure 39:
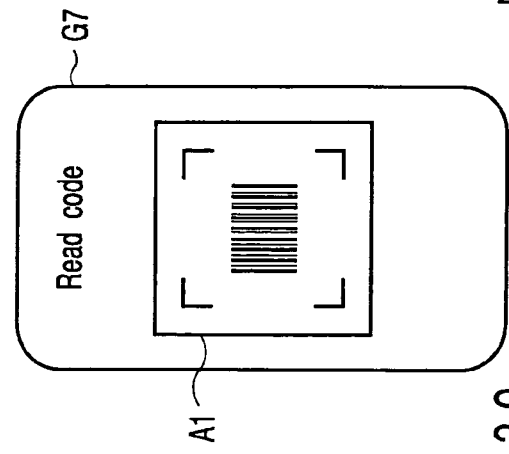
FIG. 39 is a diagram showing an example of a code read screen appeared in a display of a cellular phone, in the same embodiment.

FIG. 39 shows an example of the code read screen G7. The code read screen includes a code read area A1. A bar code or a two-dimensional data code is displayed within the code read area A1. When the code is captured by the image pickup unit 25, the decoder 27 decodes the read bar code or two-dimensional code.

The control unit 31 judges whether a bar code or a two-dimensional data code is decoded or not (step ST62). If the code is not decoded (NO in step ST62), the control unit 31 returns to step ST5, and switches the screen of the display 23 back to the menu screen G6.

If the code is decoded (YES in step ST62), the control unit 31 judges whether the decoded code includes a merchandise code (step ST63). If a merchandise code is not included (NO in step ST63), the control unit 31 returns to step ST5.

If a merchandise code is included (YES in step ST63), the control unit 31 generates a detailed merchandise information request command (step ST64). This command includes the decoded merchandise code and store code stored in the store information area 34, as retrieval conditions. The control unit 31 sends the above request command to the store management server 1 (merchandise information request unit) through the network 4.

Figure 24:
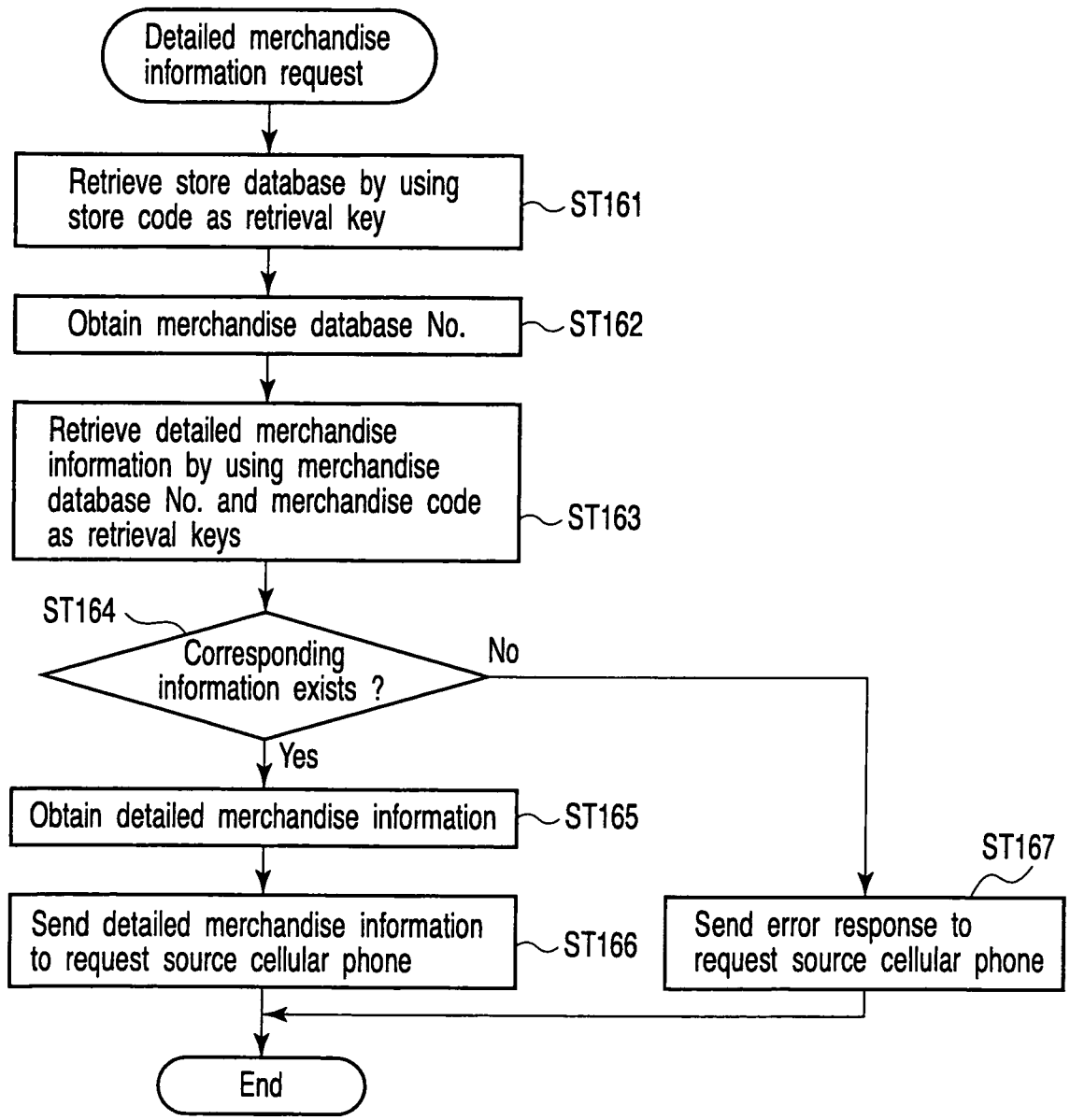
FIG. 24 is a flowchart showing the procedure of a detailed merchandise information request command receiving process executed by a control unit of a store management server, in the same embodiment.

In the store management server 1, the purchasing transaction service program P4 is resident all times. Therefore, receiving the above request command, the control unit 78 of the store management server 1 starts the processing shown in the flowchart of FIG. 24.

First, the control unit 78 retrieves the store database 11 by using a store code included in the received command as a retrieval key (step ST161) and obtains a merchandise table number from a record of a merchandise code matching the retrieval key (step ST163).

Next, the control unit 78 retrieves the merchandise database 12 by using the merchandise table number as a retrieval key (step ST163). When the merchandise data table T1 on which the merchandise table number matching the retrieval key is detected, the control unit 78 retrieves the merchandise data table T1 by using the merchandise code included in the received command as a retrieval key, and detects a merchandise data record in which the merchandise code matching the retrieval key is set.

If the merchandise data record is detected (YES in step ST164), the control unit 78 obtains detailed merchandise information, such as a merchandise name, a unit price and sales promotion information from that merchandise data record (step ST165) and sends the detailed merchandise information to the request command source, i.e., the cellular phone 3 through the network 4 (step ST166).

If the merchandise data record is not detected (NO in step ST164), the control unit 78 sends an error response command to the request command source, i.e., the cellular phone 3 through the network 4 (step ST167).

The control unit 31 of the cellular phone 3 sends a detailed merchandise information request command to the store management server 1, and waits for detailed merchandise information (step ST65). If the detailed merchandise information is received from the stored management server 1 through the network 4 (YES in step ST65), the control unit 31 stores this detailed merchandise information in the data storage 21 (step ST66). The control unit displays a detailed merchandise information screen G8 on the display 23, based on the detailed merchandise information.

Figure 40:
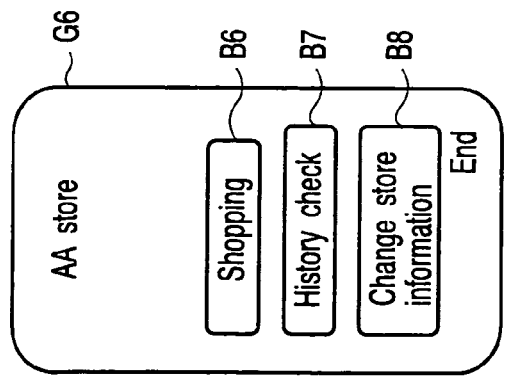
FIG. 40 is a diagram showing an example of a detailed merchandise information screen appeared in a display of a cellular phone, in the same embodiment.

FIG. 40 shows an example of the detailed merchandise information screen G8. As shown in FIG. 40, the detailed merchandise information screen G8 displays a merchandise name, a unit price and sales promotion information included in the detailed merchandise information. If merchandise image information is included in the detailed merchandise information, the merchandise image is also displayed.

The detailed merchandise information screen G8 includes a purchased number input area A2, and displays a "Buy" button B9 and a "Menu" button B10. An initial value "1" is displayed in the input area A2. A desired number can be input in the input area A2 by operating the key input section 24. The "Buy" button B9 is operated when buying merchandise whose detailed information is being displayed, and the "Menu" button B10 is operated when not buying the merchandise.

The control unit 31 waits for depression of one of the buttons (steps ST67 and ST68). If the "Menu" button B10 is pressed by operating the key input section 24 (YES in step ST67), the control unit returns to step ST5, and switches the screen of the display 23 back to the menu screen G6.

If the "Buy" button B9 is pressed on the detailed merchandise information screen G8 (YES in step ST68), the control unit 31 generates information about the purchased merchandise (step ST69). This purchased merchandise information includes the merchandise code, merchandise name and unit price already stored as detailed merchandise information, the quantity input in the input area A2, and the amount calculated from the unit price and quantity.

Then, the control unit 31 generates a merchandise purchase request command (step ST70). This command includes purchased merchandise information, a member code stored in the member code area 32, and store information (store code and store name) included in the store information area 34. The control unit 31 sends the above request command to the store management server 1 through the network 4.

Figure 25:
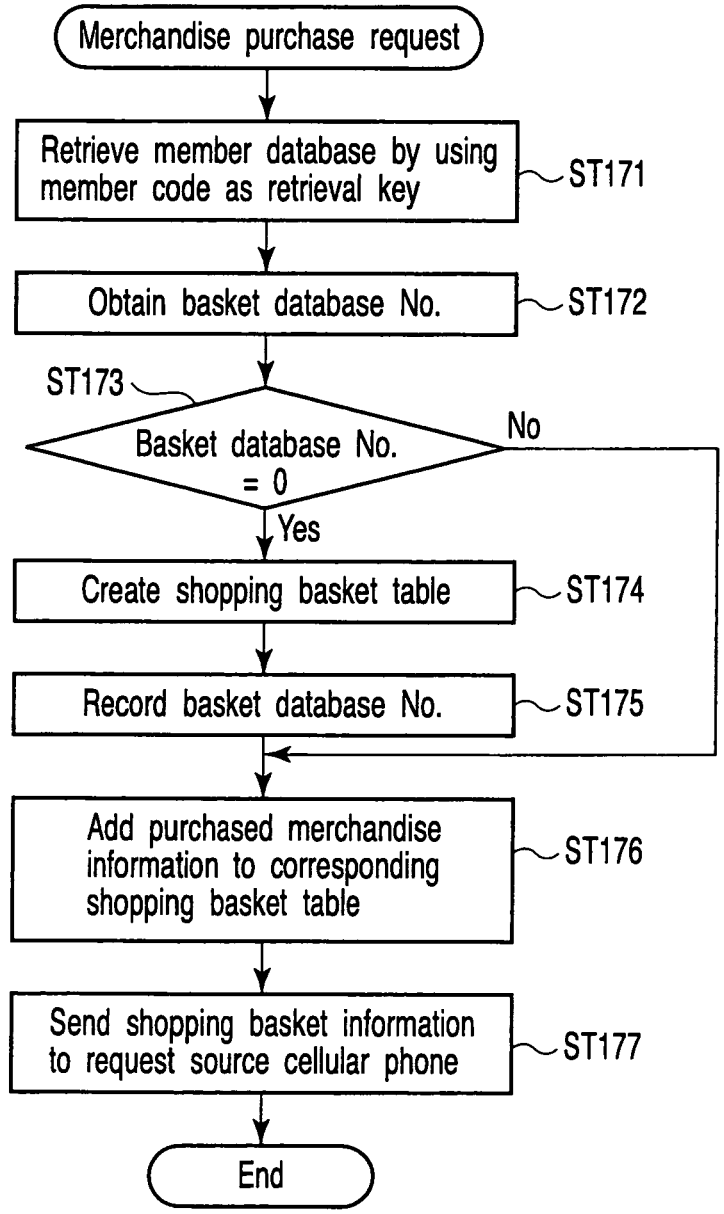
FIG. 25 is a flowchart showing the procedure of a merchandise purchasing request command receiving process executed by a control unit of a store management server, in the same embodiment.

In the store management server 1, the purchasing transaction service program P4 resides all times. Therefore, receiving the above request command, the control unit 78 of the store management server 1 starts the processing shown in the flowchart of FIG. 25.

First, the control unit 78 retrieves the member database 13 by using a member code included in the received command as a retrieval key (step ST171) and obtains a basket table number from a record of a member code matching the retrieval key (step ST172).

Then, the control unit 78 judges whether the basket table number is zero or not (step ST173). If the basket table number is zero (YES in step ST173), a shopping basket table T3 is not yet created for a member of that member code.

In this case, the control unit 78 adds a new shopping basket table T3 to the shopping basket database 15 (step ST174). The shopping basket table T3 includes an unused basket number, a store code and name included in the received command, and a shopping date counted by a clock 76. The control unit 78 records this unused basket table number in a member data record of a corresponding member code in the member database 13 (step ST175).

If the basket table number is not zero (NO in step ST173), a shopping basket table T3 is already created for a member of a corresponding member code. In this case, the control unit 78 does not execute steps ST174 and ST175.

Then, the control unit 78 stores information about the purchased merchandise in the shopping basket table T3 in which the corresponding member code is set (step ST176). The purchased merchandise information includes a merchandise code and name, a unit price, quantity and amount included in the received command, and the shopping time counted by the clock 76. The control unit 78 recalculates the total quantity and total amount. Then, the control unit 78 sends the data of this shopping basket table T3 to the request command source, i.e., the cellular phone 3 through the network 4 (step ST177).

The control unit 31 of the cellular phone 3 sends a merchandise purchase command to the store management server 1, and waits for the data of the shopping basket table T3 (step ST71). When the data of the shopping basket table T3 is received from the store management server 1 through the network 4, the control unit 31 stores the data of the shopping basket table T3 in the data storage 21 (step ST72) and displays a shopping basket screen G9 on the display 23, based on the data.

Figure 41:
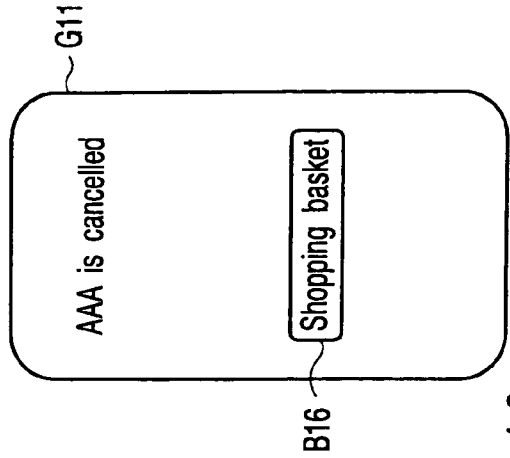
FIG. 41 is a diagram showing an example of a shopping basket screen appeared in a display of a cellular phone, in the same embodiment.

FIG. 41 shows an example of the shopping basket screen G9. As shown in FIG. 41, the shopping basket screen G9 displays a purchased merchandise name, a unit price, quantity, and total amount. The shopping basket screen has a "Code Read" button B11, a "Check out" button B12, and a "Cancel" button B13.

The "Code Read" button B11 is pressed to read a code of next merchandise. The "Check out" button B12 is pressed to declare the end of purchasing merchandise. The "Cancel" button B13 is pressed to declare cancellation of shopping.

The control unit 31 waits for depression of any one of the buttons (steps ST73-ST75). If the "Code Read" button B11 is pressed by operating the key input section 24 (YES in step ST73), the control unit 31 returns to step ST61, and switches the screen of the display 23 back to the code read screen G7.

If the "Cancel" button B13 is pressed on the shopping basket screen G9 (YES in step ST74), the control unit 31 displays a cancel screen G10 on the display 23 (step ST91).

Figure 42:
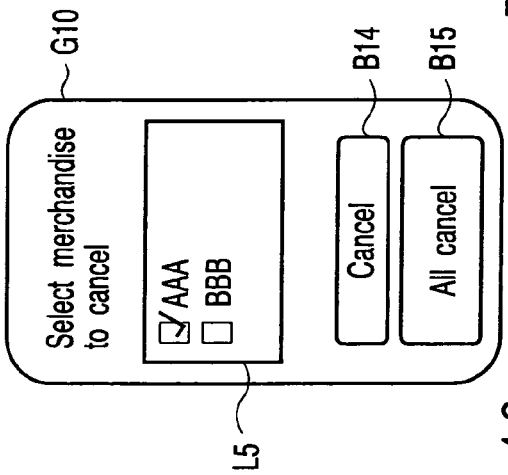
FIG. 42 is a diagram showing an example of a cancel screen appeared in a display of a cellular phone, in the same embodiment.

FIG. 42 shows an example of the cancel screen G10. As shown in FIG. 42, the cancel screen G10 includes a merchandise name checklist L5, a "Cancel" button B14, and "All Cancel" button B15. The checklist L5 displays a merchandise name stored in the received shopping basket table T3 together with a checkbox.

The "Cancel" button B14 is pressed when canceling purchase of the merchandise selected by a checkbox among those stored in the shopping basket table T3. The "All Cancel" button B15 is pressed when canceling purchase of all merchandise stored in the shopping basket table T3.

The control unit 31 waits for selection/input of one of the buttons (steps ST92 and ST93). If the "All Cancel" button B15 is pressed by pressing the key input section 24 (YES in step ST92), the control unit 31 generates a collective cancel request command (step ST96). This command includes a member code stored in the member code area 32. The control unit 31 sends the above request command to the store management server 1 through the network 4.

If the "Cancel" button B14 is pressed on the cancel screen G10 (YES in step ST93), the control unit 31 judges whether the merchandise selected by a checkbox available or not (step ST94). If the selected merchandise is available (YES in step ST94), the control unit 31 generates a merchandise cancel request command (step ST85). This command includes a merchandise code of the selected merchandise, and a member code stored in the member code area 32. The control unit 31 sends the above request command to the store management server 1 through the network 4.

If the "Cancel" button B14 is pressed, but the merchandise selected by a checkbox is not available, stop of the cancellation is declared. In this case, the control unit 31 goes to the step of displaying the cancel completion screen in step ST98.

Figure 26:
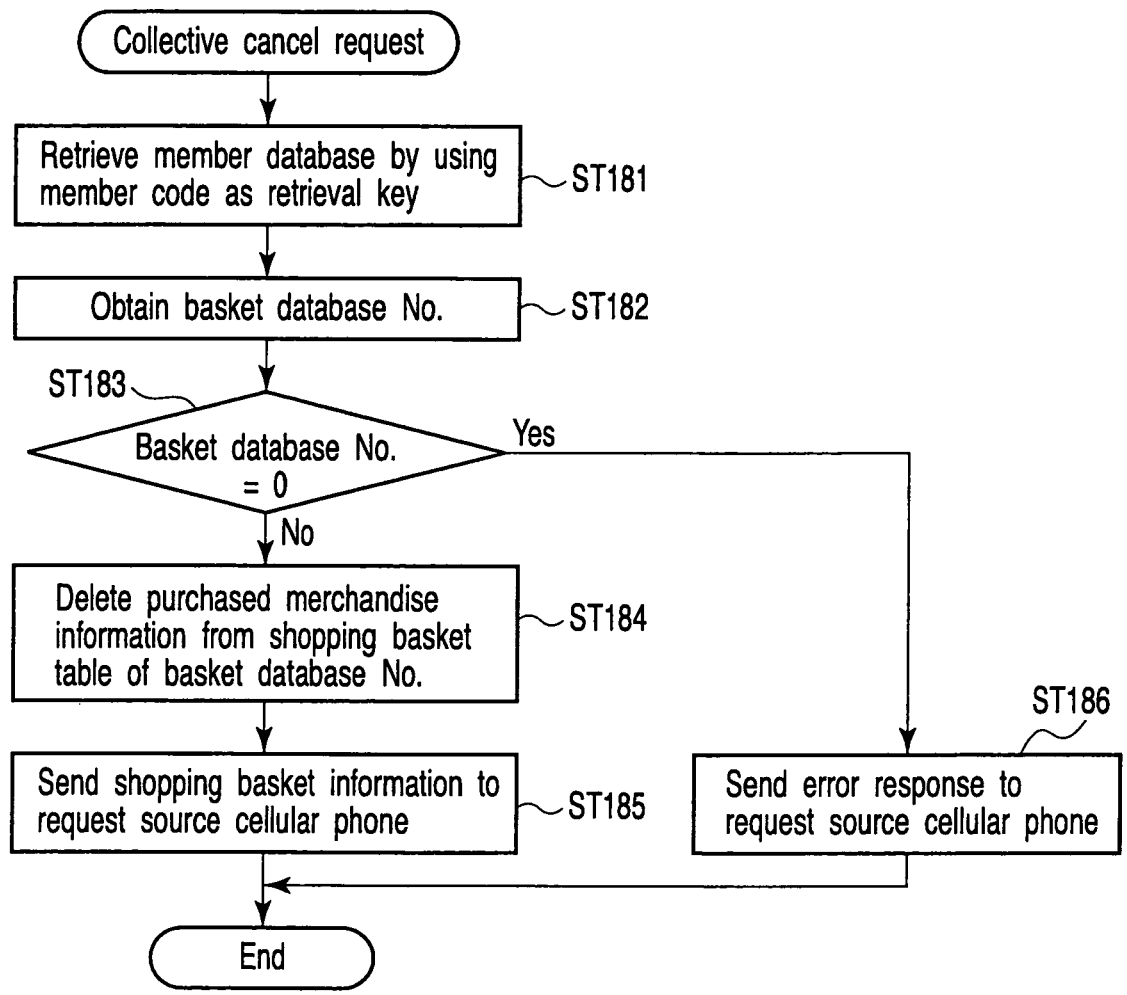
FIG. 26 is a flowchart showing the procedure of a collective cancel request command receiving process executed by a control unit of a store management server, in the same embodiment.

In the store management server 1, the purchasing transaction service program P4 resides all times. Therefore, receiving the collective cancel request command, the control unit 78 of the store management server 1 starts the processing shown in the flowchart of FIG. 26.

First, the control unit 78 retrieves the member database 13 by using a member code included in the received command as a retrieval key (step ST181) and obtains a basket table number from a member data record of a member code matching the retrieval key (step ST182).

Then, the control unit 78 judges whether the basket table number is zero or not (step ST183). If the basket table number is not zero (NO in step ST183), the control unit 78 clears information about all purchased merchandise and shopping total information from the shopping basket table T3 of that basket table number (step ST184). Then, the control unit 78 sends the data of the shopping basket table T3 to the request command source, i.e., the cellular phone 3 through the network 4 (step ST185).

If the basket table number is zero (YES in step ST183), the control unit 78 sends an error response command to the request command source, i.e., the cellular phone 3 through the network 4 (step ST186).

Receiving the merchandise cancel request command, the control unit 78 of the store management server 1 starts the processing shown in the flowchart of FIG. 27.

First, the control unit 78 retrieves the member database 13 by using a member code included in the received command as a retrieval key (step ST191) and obtains a basket table number from a member data record of a member code matching the retrieval key (step ST192).

Then, the control unit 78 judges whether the basket table number is zero or not (step ST193). If the basket table number is not zero (NO in step ST193), the control unit 78 retrieves the shopping basket table T3 of that basket table number (step ST194) and judges whether the purchased merchandise information including a merchandise code included in the received command, i.e., cancelled merchandise information is stored or not.

If the cancelled merchandise information is stored (YES in step ST195), the control unit 78 deletes that cancelled merchandise information from the shopping basket table T3 (step ST196) and recalculates the total quantity and total amount. Then, the control unit 78 sends the data of the shopping basket table T3 to the request command source, i.e., the cellular phone 3 through the network 4 (step ST197).

If the basket table number is zero (YES in step ST194), and the cancelled merchandise information is not stored in the shopping basket table T3 (NO in step ST195), the control unit sends an error response command to the request command source, i.e., the cellular phone 3 through the network 4 (step ST198).

The control unit 31 of the cellular phone 3 sends the collective cancel or merchandise cancel request command, and waits for the data of the shopping basket table T3 (step ST97). When the data of the shopping basket table T3 is received through the network 4, the control unit 31 stores the data of the shopping basket table T3 in the storage 21 (step ST98) and displays a cancel completion screen G11 on the display 23.

Figure 43:
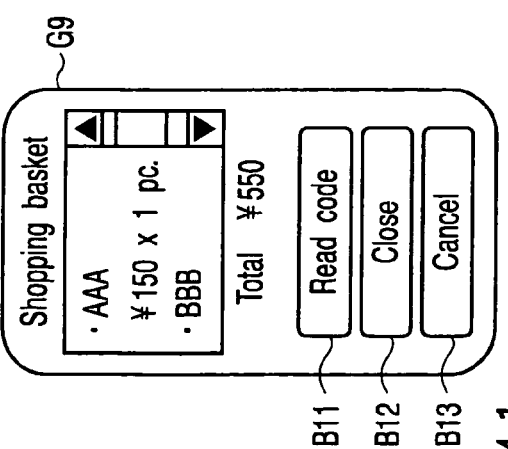
FIG. 43 is a diagram showing an example of a cancel completion screen appeared in a display of a cellular phone, in the same embodiment.

FIG. 43 shows an example of the cancel completion screen G11 after the merchandise cancel request command is sent. As shown in FIG. 43, the cancel completion screen G11 displays the name of the cancelled merchandise, and a "Shopping Basket" button B16.

The control unit 31 waits for depression of the "Shopping Basket" button B16 (step ST99). If the "Shopping Basket" button B16 is pressed, the control unit 31 returns to step ST72, and displays the shopping basket screen G9, based on the data of the shopping basket table T3 stored in the data storage 21.

If the "Check out" button B12 is pressed on the shopping basket screen G9 (YES in step ST75), the control unit 31 generates a check out command (step ST76). This command includes a member code stored in the member code area 32. The control unit 31 sends the above request command to the store management server 1 through the network 4.

Figure 28:
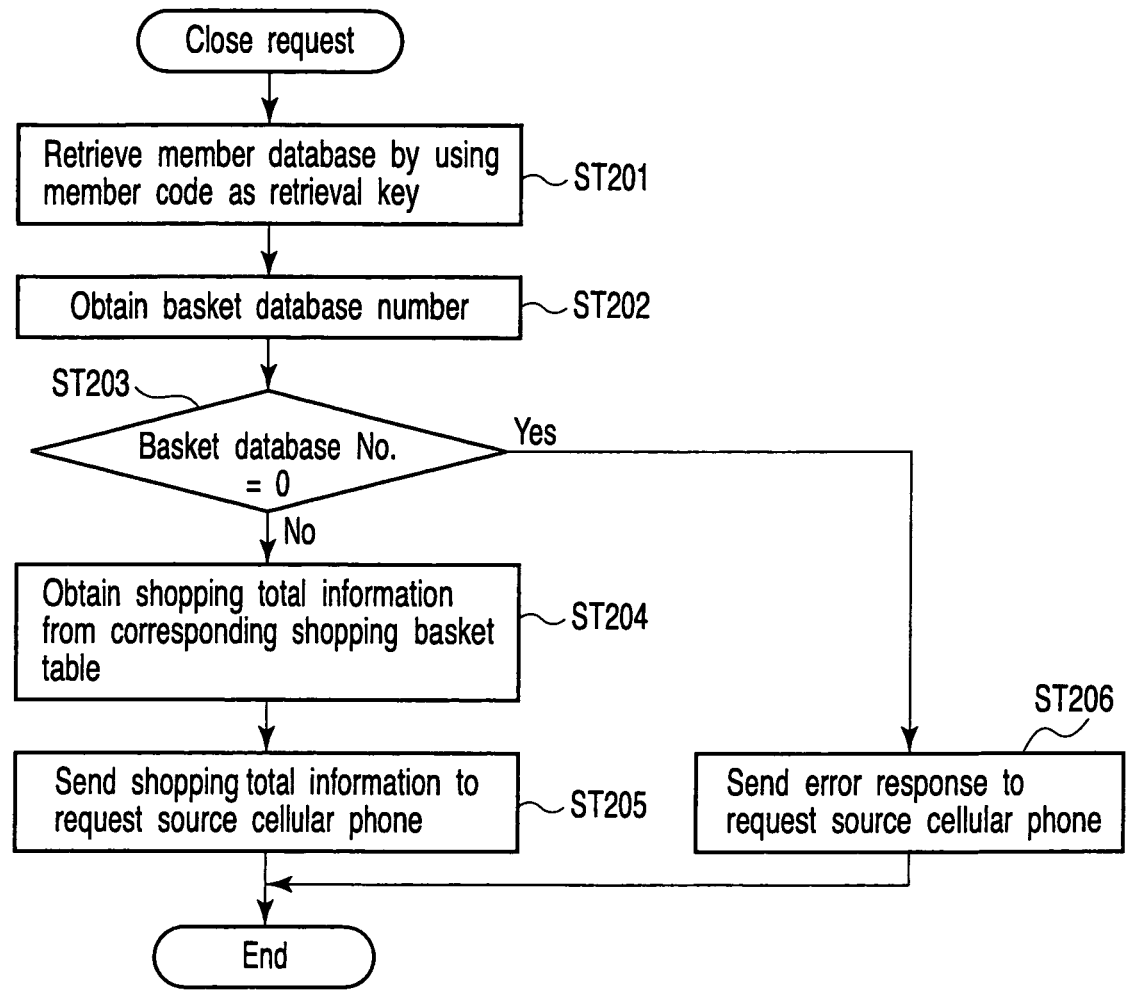
FIG. 28 is a flowchart showing the procedure of a check out request command receiving process executed by a control unit of a store management server, in the same embodiment.

In the store management server 1, the purchasing transaction service program P4 resides all times. Therefore, receiving the check out request command, the control unit 78 of the store management server 1 starts the processing shown in the flowchart of FIG. 28.

First, the control unit 78 retrieves the member database 13 by using a member code included in the received command as a retrieval key (step ST201) and obtains a basket table number from a record of a member data record of a member code matching the retrieval key (step ST202).

Then, the control unit 78 judges whether the basket table number is zero or not (step ST203). If the basket table number is not zero (NO in step ST203), the control unit 78 obtains shopping total information such as total quantity and total amount from the shopping basket table T3 of that basket table number (step ST204). Then, the control unit 78 sends the data of the shopping total information to the request command source, i.e., the cellular phone 3 through the network 4 (step ST205).

If the basket table number is zero (YES in step ST203), the control unit 78 sends an error response command to the request command source, i.e., the cellular phone 3 through the network 4 (step ST206).

The control unit 31 of the cellular phone 3 sends a check out request command, and waits for shopping total information (step ST77). When shopping total information such as total quantity and total amount is received from the store management server 1 through the network 4, the control unit 31 displays a shopping total screen G12 on the display 23 (step ST78).

Figure 44:
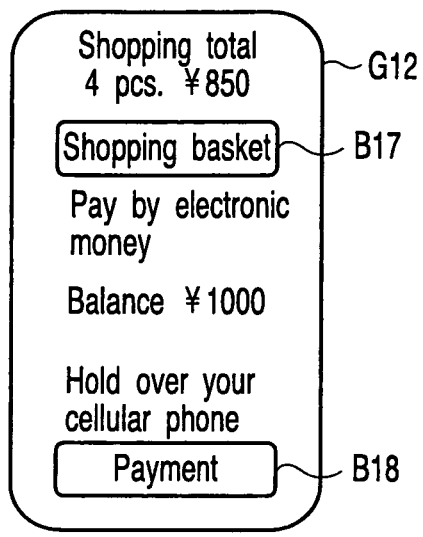
FIG. 44 is a diagram showing an example of a shopping total screen appeared in a display of a cellular phone, in the same embodiment.

FIG. 44 shows an example of the shopping total screen G12. As shown in FIG. 44, the shopping total screen G12 displays total quantity and total amount. The screen also displays the balance of electronic money stored in the electronic money area 33. Further, the screen displays a "Shopping Basket" button B17, and a "Payment" button B18.

The control unit 31 waits for selection/input of one of the buttons (steps ST79 and ST80). If the "Shopping Basket" button B17 is pressed by operating the key input section 24 (YES in step ST79), the control unit 31 returns to step ST72, and switches the screen of the display 23 back to the shopping basket screen G9.

If the "Payment" button B18 is pressed on the shopping total screen G12 (YES in step ST80), the control unit 31 performs close-range radio communication with the payment terminal 5 through the radio communication unit 29 (step ST81). When the radio communication unit 29 of the cellular phone 3 is held over the radio communication unit 59 of the payment terminal 5, and radio communication between the cellular phone and payment terminal 5 is possible, the control unit 31 sends a member code stored in the member code area 32 and the balance of electronic money stored in the electronic money area 33 to the payment terminal 5.

Figure 20:
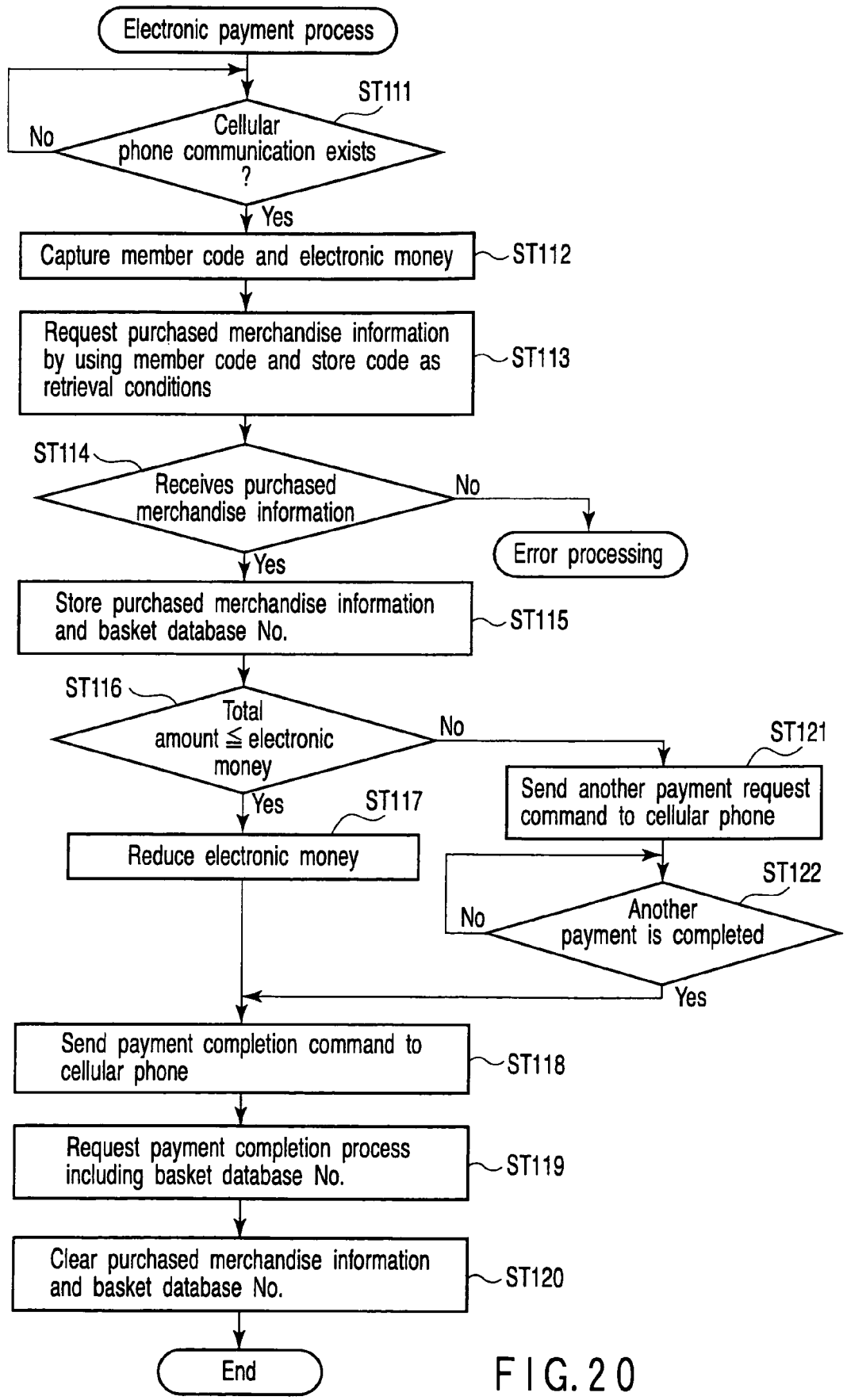
FIG. 20 is a flowchart showing the procedure of a main process executed by a control unit of a payment terminal, according to a purchasing transaction payment program, in the same embodiment.

At this time, when execution of payment for a purchasing transaction using the cellular phone 3 is declared by operating the key input section 53 in the payment terminal 5, the purchasing transaction payment program P3 is started. Therefore, the control unit 60 of the payment terminal 5 starts an electronic payment process shown in the flowchart of FIG. 20.

Namely, the control unit 60 waits for radio communication with the cellular phone 3 (step ST111). When the radio communication is executed, the control unit 60 captures a member code and electronic money data from that cellular phone 3.

Then, the control unit 60 generates a purchased merchandise information request command (step ST113). This command includes a member code received from the cellular phone 3, and a store code set in the store code area 61, as retrieval conditions. The control unit 60 sends the above request command to the store management server 1 (merchandise information request unit) through the network 4.

Figure 29:
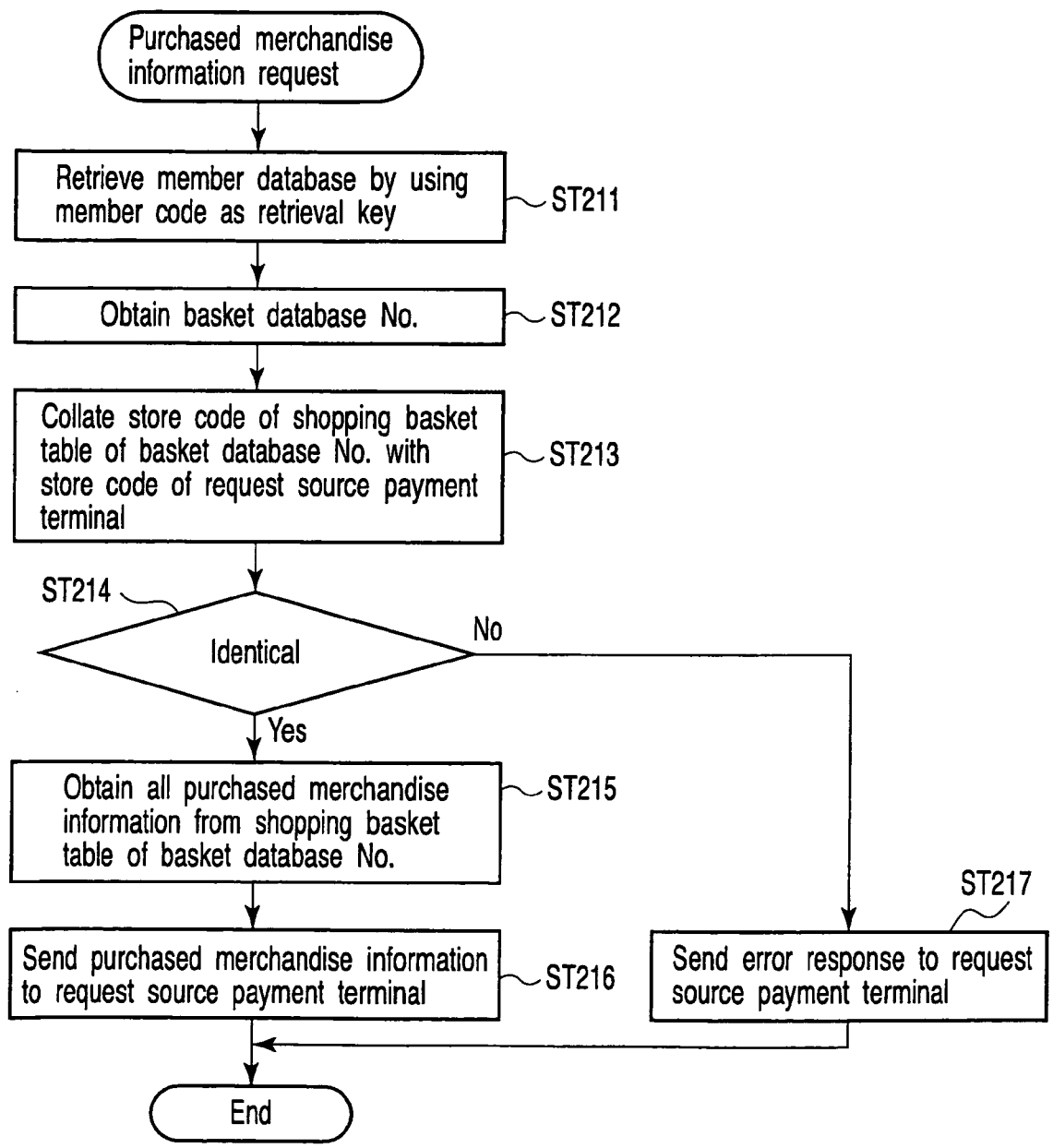
FIG. 29 is a flowchart showing the procedure of a purchased merchandise information request command receiving process executed by a control unit of a store management server, in the same embodiment.

In the store management server 1, the purchasing transaction service program P4 resides all times. Therefore, receiving the purchased merchandise information request command, the control unit 78 of the store management server 1 starts the processing shown in the flowchart of FIG. 29.

First, the control unit 78 retrieves the member database 13 by using a member code included in the received command as a retrieval key (step ST211) and obtains a basket table number from a record of a member data record of a member code matching the retrieval key (step ST212).

Then, the control unit 78 retrieves the shopping basket database 15 by using the obtained basket table number as a retrieval key (step ST213) and obtains a store code from the shopping basket table T3 of the basket table number matching the retrieval key. The control unit 78 judges whether the obtained store code matches the stored code included in the received command.

If these store codes are matched (YES in step ST214), the control unit 78 obtains purchased merchandise information such as shopping time, a merchandise code, a merchandise name, a unit price, quantity and amount, and total information such as total quantity and total amount of purchased merchandise, from that shopping basket table T3 (step ST215). Then, the control unit 78 sends the obtained purchased merchandise information and total information, and the basket table number of that shopping basket table T3, to the request command source, i.e., the payment terminal 5 through the network 4.

If the store codes are not matched (NO in step ST214), the control unit 78 sends an error response command to the request command source, i.e., the payment terminal 5 through the network (step ST217).

The control unit 60 of the payment terminal 5 sends a purchased merchandise information request command, and waits for purchased merchandise information etc. (step ST114). If purchased merchandise information, total information and basket table number are received from the store management server 1 through the network 4 (YES in step ST114), the control unit 60 stores these received information in the data storage 51 (step ST115).

Then, the control unit 60 compares the received total amount with the balance of electronic money obtained through the cellular phone 3 (step ST116). If the total amount is found to be less than the balance of electronic money as a result of the comparison (YES in step ST116), payment by electronic money is made. In this case, the control unit 60 reduces the total amount from the balance of electronic money (step ST117) and sends a payment completion command to the cellular phone 3 by radio communication (step ST118). This payment completion command includes a new balance of electronic money after the reduction of total amount.

Further, the control unit 60 generates a payment completion request command (step ST119). This command includes the basket table number received from the store management server 1. The control unit 60 sends this request command to the store management server 1 through the network 4. Then, the control unit 60 clears the purchased merchandise information and basket table number stored in the data storage 51 (step ST120. This completes the purchasing transaction payment program P3.

If the total amount is greater than the balance of electronic money (NO in step ST116), payment by electronic money is not made. In this case, the control unit 60 instructs the cellular phone 3 to use other methods of payment by radio communication (step ST121). Then, the control unit waits for the making of payment by other methods such as cash and credit card (step ST122). When payment is made, the control unit 60 goes to step ST118.

Namely, the control unit 60 sends a payment completion command to the cellular phone 3 by radio communication. The control unit 60 also sends a payment completion request command including a basket table number to the store management server 1. Then, the control unit 60 clears the purchased merchandise information and basket table number from the data storage 51.

Figure 30:
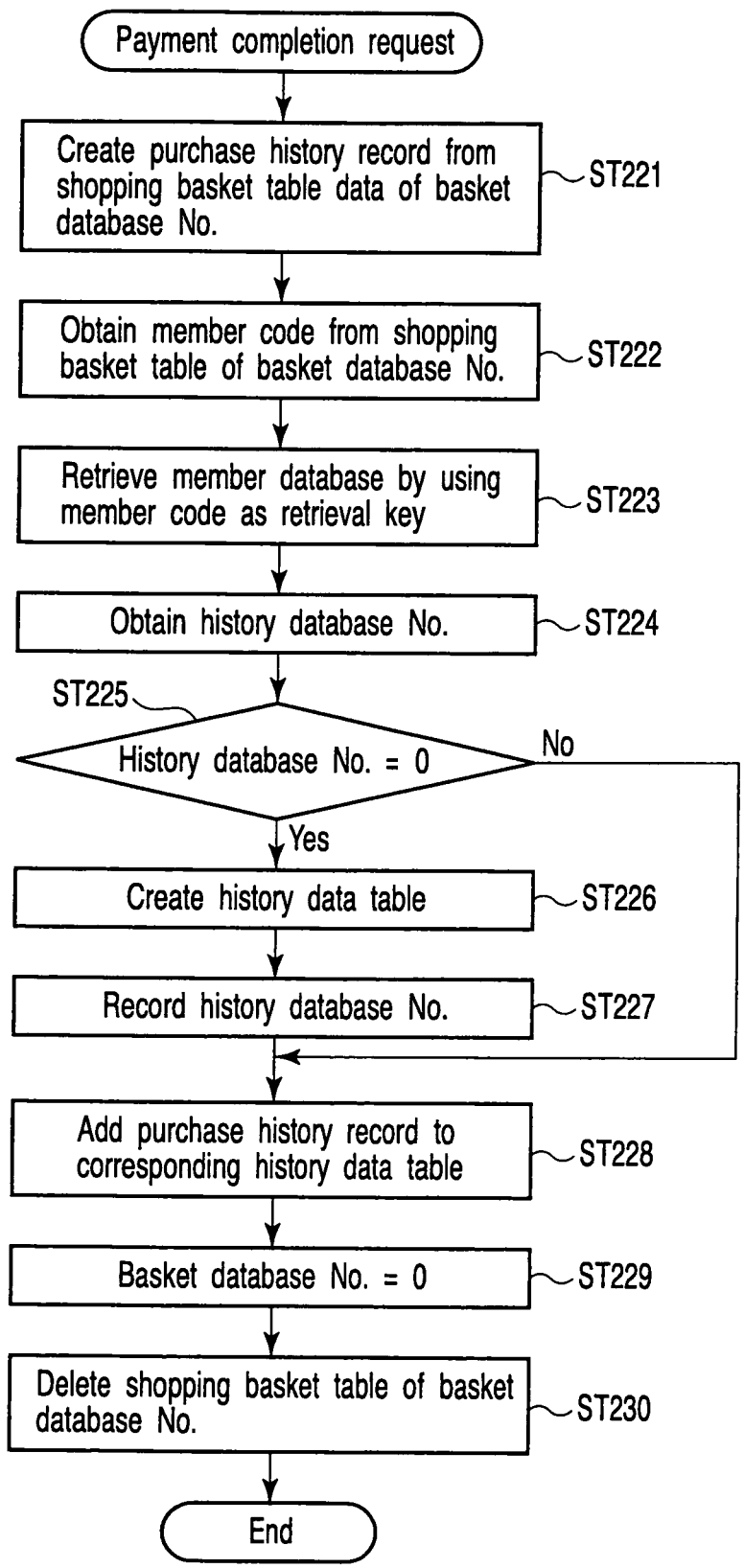
FIG. 30 is a flowchart showing the procedure of a payment completion request command receiving process executed by a control unit of a store management server, in the same embodiment.

In the store management server 1, the purchasing transaction service program P4 resides all times. Therefore, receiving the above payment completion request command, the control unit 78 of the store management server 1 starts the processing shown in the flowchart of FIG. 30.

First, the control unit 78 retrieves the shopping basket database 15 by using a basket table number included in the received command as a retrieval key (step ST221) and detects a shopping basket table T3 of a basket table number matching the retrieval key. The control unit obtains a shopping date, a store code, a store name and information about all purchased merchandise, from this shopping basket table T3, and generates a purchase history record including these information.

Then, the control unit 78 obtains a member code from this shopping basket table T3 (step ST222). The control unit retrieves the member database 13 by using this member code as a retrieval key (step ST223) and obtains a history table number from the member data record of that member code (step ST224).

Then, the control unit 78 judges whether the obtained history table number is zero or not (step ST225). If the history table number is zero (YES in step ST225), a history data table T2 is not yet generated for a member specified by that member code.

In this case, the control unit 78 adds a new history data table T2 to the history database 14 (step ST226). An unused history table number is set in this history data table T2. The control unit 78 records this unused history table number in a member data record of a corresponding member code in the member database 13 (step ST227).

If the history table number is not zero (NO in step ST225), a history data table T2 is already created for a member of a corresponding member code. In this case, the control unit 78 does not execute steps ST226 and ST227.

Then, the control unit 78 adds the purchase history record created in step ST221 to the history data table T2 for a corresponding member (step ST228). The control unit 78 rewrites the basket table number stored in the member data record of a corresponding member code, to zero (step ST229). Also (step ST230) the control unit deletes the shopping basket table T3 on which the basket table number included in the received command is set, from the shopping basket database 15.

The control unit 31 of the cellular phone 3 sends a member code and the balance of electronic money to the payment terminal 5, and waits for a payment completion command (step ST82). If an instruction to pay by other methods is received, instead of a payment completion command (NO in step ST82), the control unit 31 displays a screen to instruct other payment methods on the display 23 (step ST83) and waits again for a payment completion command.

When a payment completion command is received from the payment terminal 5, the control unit 31 displays a payment completion screen G13 on the display 23 (step ST84). At this time, when a new balance of electronic money is included in the payment completion command, the control unit updates the balance data in the electronic money area 33 to the new balance.

Figure 45:
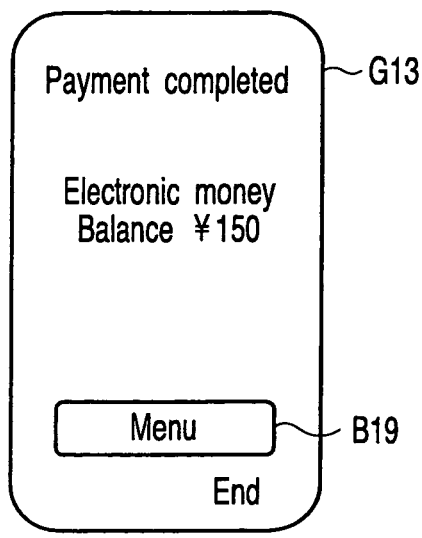
FIG. 45 is a diagram showing an example of a payment completion screen appeared in a display of a cellular phone, in the same embodiment.

FIG. 45 shows an example of the payment completion screen G13. As shown in FIG. 45, the payment completion screen G13 displays a latest balance of electronic money, and a "Menu" button B19. "End" can be selected on this screen G13.

The control unit 31 waits for depression of the "Menu" button B19 or selection of "End" (steps ST85 and ST86). If the "Menu" button B19 is pressed by operating the key input section 24 (YES in step ST85), the control unit 31 returns to step ST5, and switches the screen of the display 23 back to the menu screen G6.

If "End" is selected (YES in step ST86), the control unit 31 goes to step ST10. The control unit 31 turns off the line to the store management server 1, and clears the store information from the store information area 34. This completes the purchasing transaction terminal program P1.

Figure 19:
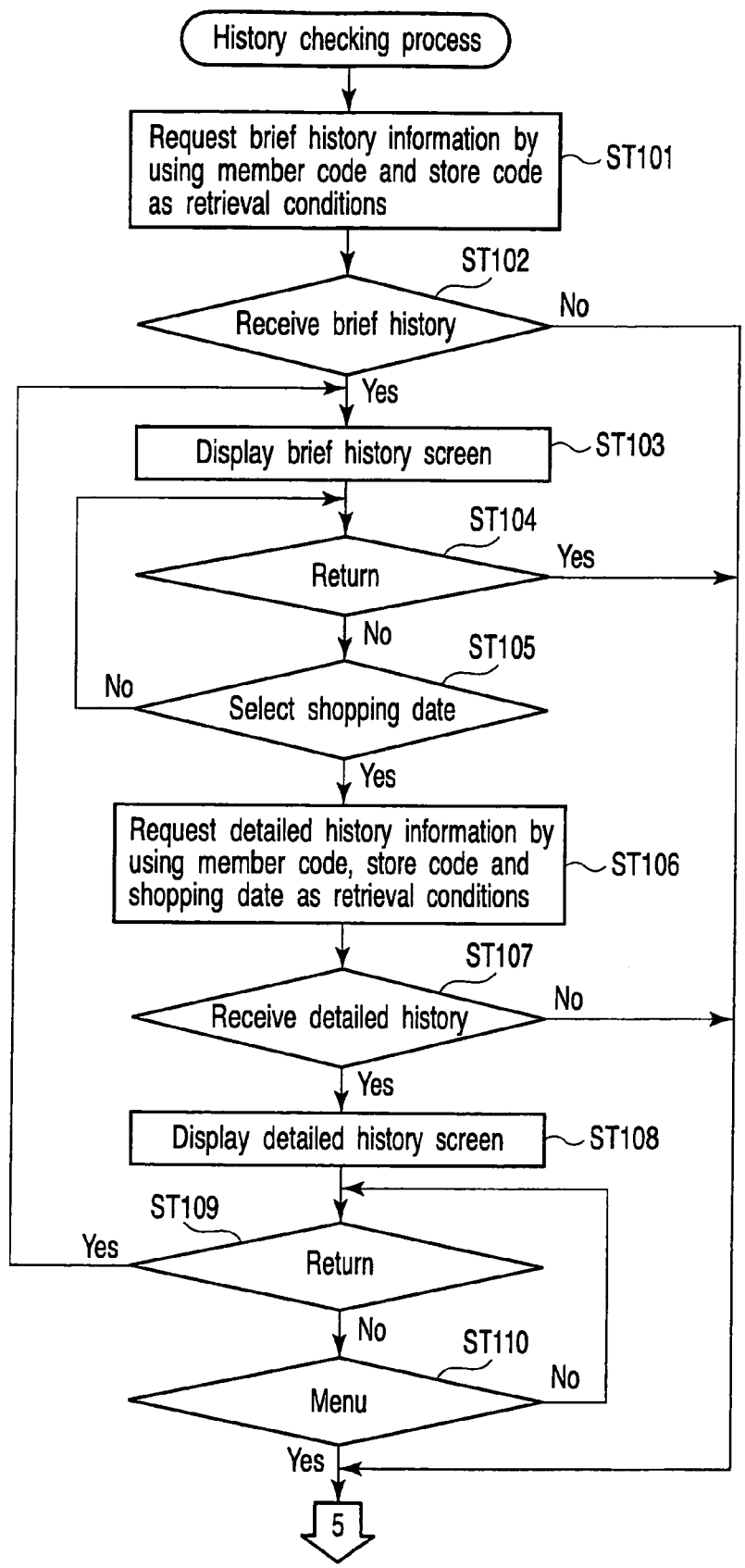
FIG. 19 is a flowchart showing the concrete procedure of a history confirmation process in FIG. 11.

If the "History Check" button B7 is pressed on the menu screen G6 (YES in step ST7), the control unit 31 starts a history check process (step ST13). This process is concretely shown in the flowchart of FIG. 19.

Namely, the control 31 generates a brief history request command (step ST101). This command includes a member code stored in the member code area 32, and a store code stored in the store information area 34, as retrieval conditions. The control unit 31 sends the above request command to the store management server 1 through the network 4.

Figure 31:
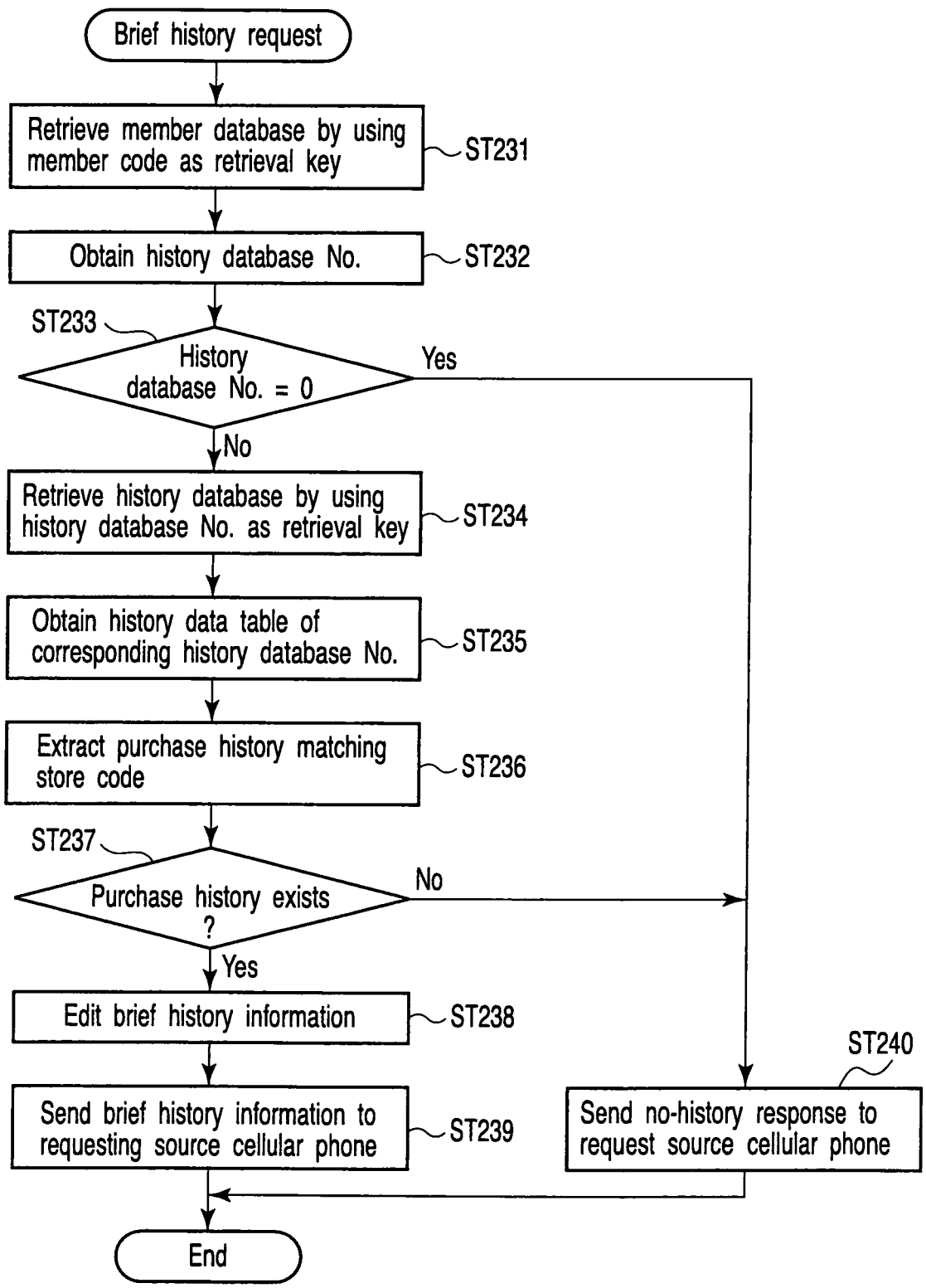
FIG. 31 is a flowchart showing the procedure of a brief history request command receiving process executed by a control unit of a store management server, in the same embodiment.

In the store management server 1, the purchasing transaction service program P4 resides all times. Therefore, receiving the brief history request command, the control unit 78 of the store management server 1 starts the process shown in the flowchart of FIG. 31.

First, the control unit 78 retrieves the member database 13 by using a member code included in the received command as a retrieval key (step ST231) and obtains a history table number from a member data record in which a member code that is the retrieval key is set (step ST232).

Then, the control unit 78 judges whether the history table number is zero or not (step ST233). If the history table number is not zero (NO in step ST233), the control unit 78 retrieves the history database 14 by using the history table number as a retrieval key (step ST234). The control unit detects a history data table T2 of a history table number matching the retrieval key (step ST235).

Then, the control unit 78 extracts a purchase history record in which a store code included in the received command is set, from the detected history data table T2 (step ST236). The control unit 78 judges whether the purchase history record is extracted or not (step ST237). If the record is extracted (YES in step ST237), the control unit 78 generates brief history information from the extracted purchase history record (step ST238). The control unit 78 sends this brief history information to the request command source, i.e., the cellular phone 3 through the network 4 (step 239).

If the history table number is zero (YES in step ST233), or a purchase history record matching a store code is not extracted (NO in step ST237), the control unit 78 sends a no-history response command to the request command source, i.e., the cellular phone 3 through the network 4 (step ST240)

The control unit 31 of the cellular phone 3 sends a brief history request command, and waits for brief history information (step ST102). If the brief history information is not received, the control unit returns to the menu screen G6.

If the brief history information is received from the store management server 1 through the network 4 (YES in step ST102), the control unit 31 displays a brief history screen G14 on the display 23 (step ST103).

Figure 46:
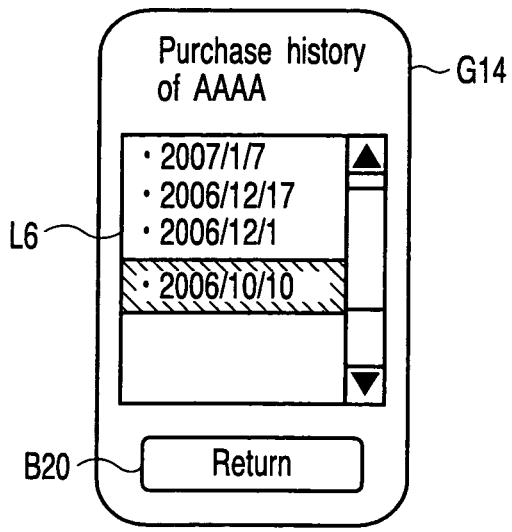
FIG. 46 is a diagram showing an example of a brief history screen appeared in a display of a cellular phone, in the same embodiment.

FIG. 46 shows an example of the brief history screen G14. As shown in FIG. 46, the brief history screen G14 displays brief history information as a shopping date list L6, and a "Return" button B20.

The control unit 31 waits for depression of the "Return" button B20, or selection of any one of the shopping dates in the list L6. If the "Return" button B20 is pressed by operating the key input section 24 (YES in step ST104), the control unit 31 returns to the menu screen G6

If any one of the shopping dates is selected on the brief history screen G14 (YES in step ST105), the control unit 31 generates a detailed history request command (step ST106). This command includes a member code in the member code area 32, a store code in the store information area 34, and data of a selected shopping date, as retrieval conditions. The control unit 31 sends the above request command to the store management server 1 through the network 4.

Figure 32:
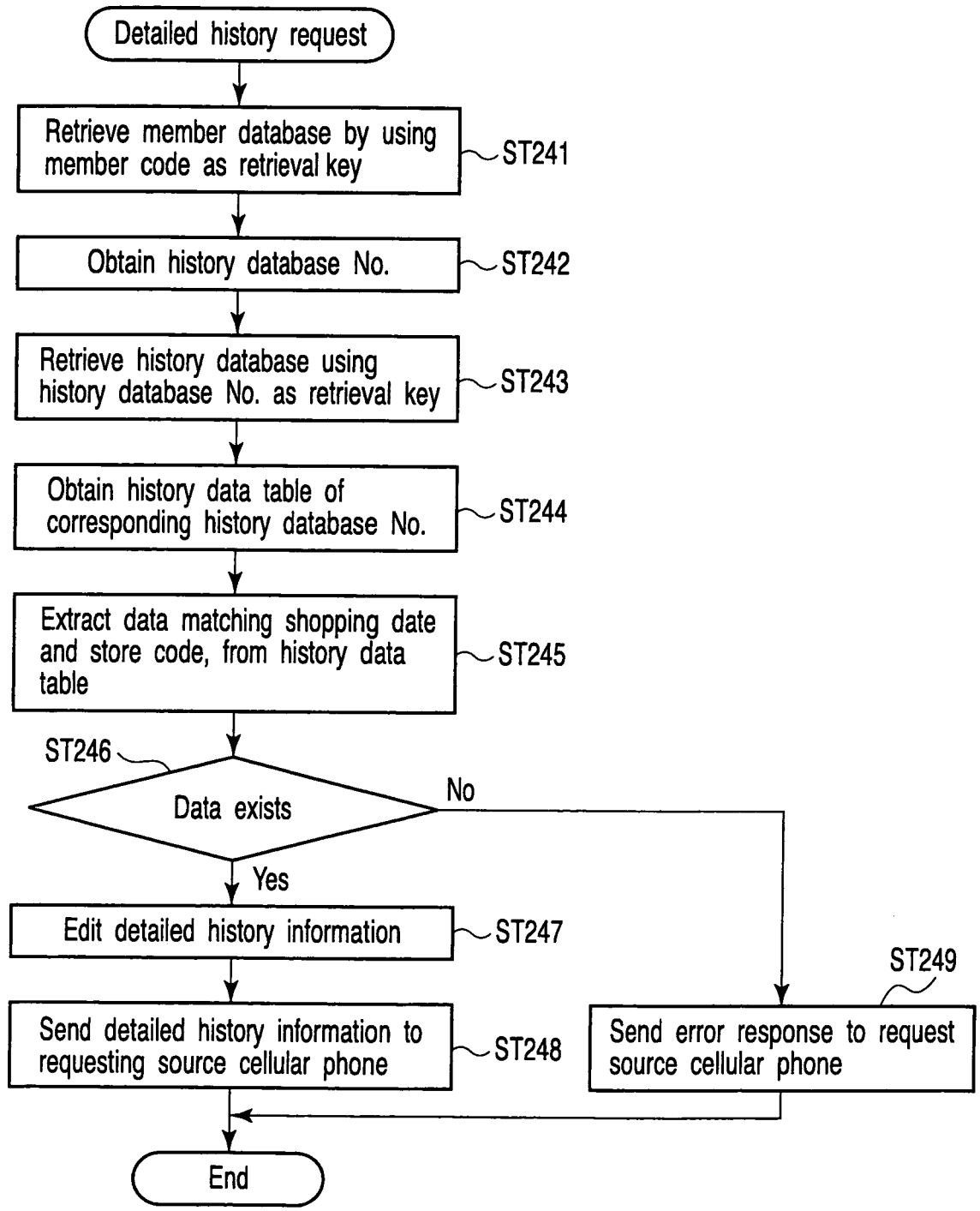
FIG. 32 is a flowchart showing the procedure of a detailed history request command receiving process executed by a control unit of a store management server, in the same embodiment.

In the store management server 1, the purchasing transaction service program P4 resides all times. Therefore, receiving the detailed history request command, the control unit 78 of the store management server 1 starts the process shown in the flowchart of FIG. 32.

First, the control unit 78 retrieves the member database 13 by using a member code included in the received command as a retrieval key (step ST241) and obtains a history table number from a member data record of a member code matching the retrieval key (step ST242).

This history table number has been confirmed not zero in the preceding brief history request command receiving process. The control unit 78 retrieves the history database 14 by using this history table number as a retrieval key (step ST243). The control unit 78 detects a history data table T2 of a history table number matching the retrieval key (step ST244).

Then, the control unit 78 extracts a purchase history record in which both the shopping date and store code included in the received command are set, from the detected history data table T2 (step ST245). The control unit 78 judges whether the corresponding purchase history record is extracted or not (step ST246). If the record is extracted (YES in step ST246), the control unit 78 generates detailed history information from the purchased merchandise information about the extracted purchase history record (step ST247). The control unit 78 sends this detailed history information to the request command source, i.e., the cellular phone 3 through the network 4 (step 248).

If purchase history information matching the shopping date and store code is not extracted (NO in step ST246), the control unit 78 sends an error response command to the request command source, i.e., the cellular phone 3 through the network 4 (step ST249).

The control unit 31 of the cellular phone 3 sends a detailed history request command, and waits for detailed history information (step ST107). If the detailed history information is not received (NO in step ST107), the control unit returns to the menu screen G6.

If the detailed history information is received from the store management server 1 through the network 4 (YES in step ST107), the control unit 31 displays a detailed history screen G15 on the display 23 (step ST108).

Figure 47:
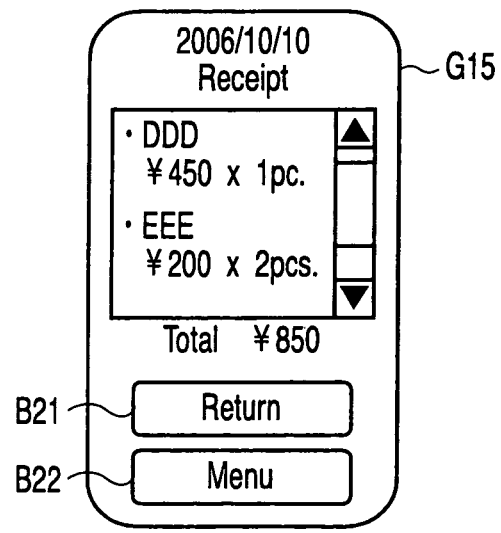
FIG. 47 is a diagram showing an example of a detailed history screen appeared in a display of a cellular phone, in the same embodiment.

FIG. 47 shows an example of the detailed history screen G15. As shown in FIG. 47, the detailed history screen G15 displays the details and total of purchased merchandise information received as detailed history information, as detailed purchase history. The screen has a "Return" button B21, and a "Menu" button B22.

The control unit 31 waits for depression of one of the buttons (steps ST109 and ST110). If the "Return" button 21 is pressed by operating the key input section 24 (YES in step ST109), the control unit 31 returns to step ST103, and switches the screen of the display 23 back to the brief history screen G14.

If the "Menu" button B22 is selected (YES in step ST110), the control unit 31 returns to step ST5, and switches the screen of the display 23 back to the menu screen G6.

A customer (member) who downloads the purchasing transaction terminal program P1 to the cellular phone 3 can use the support service by the store management server 1, in a physical retail store acceded to the purchasing transaction support service.

First, the customer selects start of a purchasing transaction by operating the key input section 24 of the cellular phone 3. The store information acquisition screen G1 appears on the display 23 of the cellular phone 3. Then, the customer registers store identity information about a store where shopping is actually made, in the cellular phone 3.

There are four methods of registering store identity information in the cellular phone 3.

A first method uses radio communication to obtain the information from the store terminal 6 installed in a store. The customer approaches the radio communication unit 29 of the cellular phone 3 to the radio communication unit 45 of the store terminal 6, and press the "Update" button B1 on the store information acquisition screen G1. The store identify information (store code and store name) preset in the store terminal 6 is sent to the cellular phone 3, and stored in the store information area 34 of the cellular phone 3.

A second method uses a purchasing transaction history of the customer. The customer presses the "History" button B2 on the store information acquisition screen G1. Then, the cellular phone 3 of the customer is connected to the line to the store management server 1, and a historical store list request command is sent to the store management server 1.

Receiving this command, the store management server 1 retrieves the history database 14, and a list of stores where the user made a purchasing transaction in the past is created. This data is sent to the cellular phone 3, and displayed as a store name list L1 on the display 23 of the cellular phone 3.

The customer selects a store where shopping is actually made, from the store names in the list L1. Store identity information about the selected store is stored in the store information area 34 of the cellular phone 3.

A third method uses a store list. The customer presses the "Store Select" button B3 on the store information acquisition screen G1. Then, the cellular phone 3 of the customer is connected to the line to the store management server 1, and an affiliated store list request command is sent to the store management server 1.

Receiving this command, the store management server 1 retrieves the store database 11, and creates a list of affiliated stores. This data is sent to the cellular phone 3, and displayed as affiliated store lists L2-L4 on the display 23 of the cellular phone 3.

The customer selects a store where shopping is actually made, from the affiliated store names in the lists L2-L4. Store identity information about the selected store is stored in the store information area 34 of the cellular phone 3.

A fourth method uses a GPS unit. The customer presses the "Position Information" button B4 on the store information acquisition screen G1, in a shop where a purchasing transaction is actually made, or an area near that store. Then, the GPS unit 30 is operated, and present location information is calculated. The line to the store management server 1 is connected, and the present location information is sent to the store management server 1.

In the store management server 1, a store nearest to a present location is retrieved from the position information about the stores set in the store database 11. The store identity information about that store is sent to the cellular phone 3, and stored in the store information area 34.

When the store identity information is registered in the cellular phone 3, the menu screen G6 appears on the display 23 of the cellular phone 3. The menu screen G6 displays the store name of the registered store identity information. Therefore, the customer can confirm whether the store where a purchasing transaction is made is identical to the store registered in the cellular phone 3.

After registering store identity information, the customer operates the key input section 24 of the cellular phone 3, and presses the "Shopping" button B6 on the menu screen G6. Then, the code read screen G7 appears. The customer reads a merchandise code of merchandise to buy. When the merchandise code is read, a detailed merchandise information request command, including a merchandise code of that merchandise and a store code in the store information area 34, is sent to the store management server 1.

Receiving this command, the store management server 1 first retrieves the store database 11, and detects a merchandise table number from a record of a store code included in the command. Then, the merchandise database 12 is retrieved, and a merchandise data table T1 of that merchandise table number is detected. Detailed information about the merchandise identified by the merchandise code included in the command is read from this merchandise data table T1. This detailed merchandise information is sent to the cellular phone 3. Receiving this detailed merchandise information, the detailed merchandise information screen G8 appears on the display 23 of the cellular phone 3.

Here, in the merchandise data table T1 detected from the merchandise database 12, the merchandise data of the store specified by the store identity information registered by the customer is set. Therefore, it is possible to exactly provide the customer with the prices or sales promotion information about the merchandise sold at a store where the customer is actually shopping.

When deciding to buy merchandise, the customer presses the "Buy" button B9 on the detailed merchandise information screen G8. Then, in the store management server 1, a shopping basket table T3 is created for this customer, and stored in the shopping basket database 15. The data of the merchandise that the customer decides to buy is stacked in the shopping basket table T3.

If the "Buy" button B9 is pressed, the shopping basket screen G9 corresponding to the contents of the shopping basket table T3 at that time appears on the display 23 of the cellular phone 3. Therefore, the customer can easily confirm the contents of the merchandise decided to buy.

On finishing shopping, the customer presses the "Check out" button B12 on the shopping basket screen G9. The screen of the display 23 is switched to the shopping total screen G12. The customer goes to the payment terminal 5 in the store, holds the radio communication unit 45 of the cellular phone 3 over the radio communication unit 59 of the payment terminal 5 and press the "Payment" button B18 on the shopping total screen G12. A member code and the balance of electronic money of the customer are sent from the cellular phone 3 to the payment terminal 5 by a radio wave.

The payment terminal 5 generates a purchased merchandise request command including the member code received from the cellular phone 3 and the previously set store code. This command is sent to the store management server 1.

Receiving this command, the store management server 1 retrieves the shopping basket database 15, and detects a shopping basket table T3 matching the member code and store code included in the command. The data of the shopping basket table T3 is sent back to the payment terminal 5.

Receiving the data of the shopping basket table T3, the payment terminal 5 executes payment by electronic money based on the received data. When the payment is completed, the electronic money data of the cellular phone 3 is updated. The payment completion screen G13 appears on the display 23 of the cellular phone 3. The customer instructs "End" on the payment completion screen G13.

When the payment is completed, the payment terminal 5 sends a payment completion request command to the store management server 1. Receiving this command, the store management server 1 generates purchase history information based on the data of the shopping basket table T3 of this customer. The purchase history information is stacked in a history data table T2 for each customer. The purchase history information includes information to identify the store where the customer made a purchasing transaction, in addition to a shopping date and purchased merchandise information.

To confirm a history of purchasing transactions in a store registered by a store information acquisition process, the customer presses the "History Check" button B7 on the menu screen G6. A brief history information request command including a member code and a store code stored in the data storage 21 is sent to the store management server 1.

Receiving this command, the store management server 1 first retrieves the member database 13, and detects a history table number from a record of a member code included in the command. Then, the server 1 retrieves the history database 14, and detects a history data table T2 matching the detected history table number. The purchase history information in a store identified by a store code included in the command is read from this history data table T2. This purchase history information is sent to the cellular phone 3. In the cellular phone 3 receiving the purchased history information, the brief history screen G14 appears on the display 23. The screen G14 displays the purchased history information as a shopping date list L6.

The customer selects a date wanted to confirm detailed history in the shopping date list 16. Then, a list of the merchandise purchased on that shopping date is displayed.

As described above, according to this embodiment, the customer can easily read the information about the merchandise sold at a store where the customer is actually shipping, by using the cellular phone 3 carried by the customer. The customer can also easily read the history of purchasing transactions at that shop by using the cellular phone 3.

The invention is not to be limited to the embodiment disclosed herein. The invention can be embodied in a practical stage by modifying the components without departing its spirit or essential characteristics.

For example, in the embodiment described herein, the cellular phone 3 is taken as an example of a portable communication terminal. However, a microcellular phone or personal digital assistant (PDA) may be used instead.

Further, in the above embodiment, one store management server 1 is commonly used by stores, but a store management server 1 may be provided in each store.

A cellular phone 3 is used for electronic payment in the above embodiment, but a method of payment is not to be limited to this. The invention may be a purchasing transaction support system, which is not provided with a payment function, but configured to easily read merchandise information in each store by a portable communication terminal such as a cellular phone.

In the aforementioned embodiment, store information is obtained from a store terminal 6 by close-range radio communication. Store information may be obtained by displaying a barcode or two-dimensional barcode corresponding to a store code on the display 42 of the store terminal 6, and shooting that image by the image pickup unit 25 of the cellular phone 3.

For methods of obtaining store information are disclosed herein. But, a method of obtaining store information may be any one of these methods, or two or more of them.

Further, in the embodiment disclosed herein, a function to embody the invention is previously recorded in the system. A similar function may be downloaded to the system through a network, or a recording medium prerecorded with a similar function may be installed in the system. A recording medium may be any form, such as a CD-ROM, as long as it can store a program or can be read from the system. It is also permitted to realize such a function obtained by pre-installation or downloading, by cooperating with an operating system (OS) in the system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A purchasing transaction support system comprising a portable communication terminal, and a store management apparatus to receive and execute a request from the portable communication terminal through a network,
   wherein the portable communication terminal comprises a store identity information storage configured to store information to identify each store;
   an input unit configured to input merchandise identity information to identify merchandise to be purchased;
   a merchandise information request unit configured to request merchandise information from the store management apparatus through the network, by using the merchandise identity information and store identity information as retrieval conditions;
   a store information receiving unit configured to receive information sent from the store management apparatus through the network;
   a merchandise information display configured to display merchandise information, when the store information receiving unit receives the merchandise information,
   the store management apparatus comprises a merchandise information storage configured to store merchandise information including a price of merchandise sold in each store;
   a terminal request receiving unit configured to receive a request from the portable communication terminal through the network;
   a merchandise information detector configured to retrieve the merchandise information storage, and detect merchandise information about merchandise identified by merchandise identity information included in the merchandise information request, including a price in a store identified by the store identity information included in the request, each time the terminal request receiving unit receives the request;
   a merchandise information sending unit configured to send the merchandise information detected by the merchandise information detector, to the portable communication terminal through the network;
   wherein the portable communication terminal further comprises a store identity information acquisition unit configured to acquire the store identity information about a store where a purchasing transaction is made, and the store identity information acquired by the store identity information acquisition unit is stored in the store identity information storage;
   a store terminal provided in each said store, the store terminal comprises a communication unit configured to communicate with the portable communication terminal;
   a store identity information setting unit configured to set the store identity information;
   a store identity information sending unit configured to send the store identity information set in the store identity information setting unit, to the portable communication terminal through the communication unit;
   the portable communication terminal further comprises a store identity information receiving unit configured to receive store identity information sent from the store terminal;
   the store identity information acquisition unit acquires store identity information received by the store identity information receiving unit;
   wherein the portable communication terminal is configured to conduct close-range radio communication with the store terminal;
   the portable communication terminal possesses a request command sender for sending a request command of store information to the store terminal after the portable communication terminal arrives at the store, radio communication between the portable communication terminal and the store terminal is initiated by the request command, the request command is without merchandise information; and
   the store terminal possesses a request command receiver for receiving the request command from the portable communication terminal.

2. The purchasing transaction support system according to claim 1, wherein the portable communication terminal further comprises a present location calculation unit configured to calculate a present location based on a radio wave received from a Global Positioning System satellite;
   a store identity information request unit configured to request store identity information from the store management apparatus through the network, by using present location information calculated by the present location calculation unit as a retrieval condition,
   the store management apparatus further comprises a store information storage configured to store present location information about a store, corresponding to store identity information about said each store;
   a store identity information detector configured to retrieve the store information storage, and detect store identity information about a store whose address is nearest to a present location indicated by present location information included in the store identity information request, each time the terminal request receiving unit receives the request;
   a store identity information sending unit configured to send store identity information detected by the store identity information detector, to the request source portable communication terminal through the network, and
   the store identity information acquisition unit of the portable communication terminal acquires store identity information received by the store information receiving unit.

3. The purchasing transaction support system according to claim 1, wherein a payment terminal is provided in said each store,
   the portable communication terminal further comprises a purchaser identity information storage configured to store information to identify a purchaser;

a merchandise purchase acceptance unit configured to determine whether to accept purchase of merchandise displayed in the merchandise information display; and a purchase processing request unit configured to request a purchase processing from the store management apparatus through the network, when purchase of merchandise is accepted by the merchandise purchase acceptance unit, by using purchased merchandise information including a price and merchandise information about the merchandise, purchaser identity information stored in the purchaser identity information storage, and store identity information stored in the store identity information storage, as requirements, and the store management apparatus further comprises a payment request receiving unit configured to receive a request from the payment terminal through the network;

a shopping information storage configured to store purchased merchandise information, purchaser identity information and store identity information included in the purchase processing request, each time the terminal request receiving unit receives the request;

a purchased merchandise information detector configured to retrieve the shopping information storage by using purchaser identity information and store identity information included in a purchased merchandise information request, and detect purchased merchandise information matching the purchaser identity information and store identity information, each time the payment request receiving unit receives the request; and a purchased merchandise information sending unit configured to send the purchased merchandise information detected by the purchased merchandise information detector, to the payment terminal through the network, and the payment terminal comprises a store identity information setting unit configured to set the store identity information;

a purchaser identity information take-in unit configured to take in the purchaser identity information from the portable communication terminal;

a purchased merchandise information request unit configured to request purchased merchandise information from the store management apparatus through the network, by using purchaser identity information taken in by the purchaser identity information take-in unit and store identity information set in the store identity information setting unit, as requirements;

a purchased merchandise information receiving unit configured to receive purchased merchandise information sent from the store management apparatus through the network; and a payment processing unit configured to pay for a purchasing transaction based on purchased merchandise information received by the purchased merchandise information receiving unit.

4. The purchasing transaction support system according to claim 3, wherein the store management apparatus further comprises a purchase history storage configured to stack purchased merchandise information, purchaser identity information, and store identity information stored in the shopping information storage;

a historical store information extraction unit configured to retrieve the purchase history storage, and extract all store identity information stored in being related to purchaser identity information included in a historical store information request, each time the terminal request receiving unit receives the request;

a historical store information sending unit configured to send store identity information extracted by the historical store information extraction unit, to the request source portable communication terminal through the network, the portable communication terminal further comprises a historical store information request unit configured to request historical store information from the store management apparatus through the network, by using purchaser identity information stored in the purchaser identity information storage, as a retrieval condition;

a list display configured to display a list of stored identity information, when the store identity information is received by the store information receiving unit; and a store selection unit configured to select any one of the store identity information in the list displayed in the list display, and the store identity information acquisition unit acquires store identity information selected by the store selection unit.

5. A portable communication terminal to perform communication with a server through a network, comprising:

a store identity information acquisition unit configured to acquire store identity information about a store where a purchasing transaction is made;

a store identity information storage configured to store identity information acquired by the store identity information acquisition unit;

an input unit configured to input merchandise identity information about merchandise to be purchased;

a merchandise information request unit configured to request merchandise information from the server through the network, by using the merchandise identity information and store identity information, as retrieval conditions;

an information receiving unit configured to receive information sent from the server through the network;

a merchandise information display configured to display merchandise information, when the information receiving unit receives the merchandise information from the server;

a radio communication unit configured to perform radio communication with a store terminal provided in each of a plurality of stores, radio communication between the portable communication terminal and the store terminal is initiated by transmission of a request command for store information from the portable communication terminal to the store terminal after the portable communication terminal arrives at the store, the request command does not include merchandise information, the store identity information acquisition unit acquires store identity information received by the radio communication unit; and the portable communication terminal is configured to conduct close-range radio communication with the store terminal, the store terminal possesses a request command receiver for receiving the request command from the portable communication terminal.

6. The portable communication terminal according to claim 5, further comprising:

a purchaser identity information storage configured to store purchaser identity information;

a merchandise purchase acceptance unit configured to determine whether to accept purchase of merchandise displayed in the merchandise information display; and a purchase processing request unit configured to request a purchase processing from the store management apparatus through the network by using purchased merchandise information including a price and information to identify the merchandise, purchaser identity information stored in the purchaser identity information storage, and store identity information stored in the store identity information storage, as requirements, when the merchandise purchase acceptance unit accepts purchase of merchandise.

7. The portable communication terminal according to claim 6, further comprising:
 a radio communication unit configured to perform radio communication with a payment terminal provided in each store; and
 a purchaser identity information sending unit configured to send purchaser identity information stored in the purchaser identity information storage, to a payment terminal through the radio communication unit.

8. The portable communication terminal according to claim 5, further comprising:
 a present location calculation unit configured to calculate a present location based on a radio wave received from a Global Positioning System satellite; and
 a store identity information request unit configured to request store identity information from the server through the network, by using present location information calculated by the present location calculation unit, as a retrieval condition,
 wherein the store identity information acquisition unit acquires store identity information which the information receiving unit receives from the server.

9. A computer-readable program product, which functions a portable communication terminal to perform communication with a server through a network, as a device for a purchasing transaction, realizing the following functions in the portable communication terminal:
 a function to acquire store identity information about a store where a purchasing transaction is made with a radio communication unit configured to perform radio communication with a store terminal provided in each store, the radio communication is initiated by a store information request command sent from the portable communication terminal to the store terminal after the portable communication terminal arrives at the store, the store information request command excludes merchandise information, a store identity information acquisition unit acquires store identity information received by the radio communication unit;
 a function to conduct close-range radio communication with the store terminal, the store terminal possesses a request command receiver for receiving the store information request command from the portable communication terminal;
 a function to store acquired store identity information in a memory of the terminal;
 a function to accept an input of merchandise identity information about merchandise to be purchased, from an input unit of the terminal;
 a function to request merchandise information from the server through the network, by using the merchandise identity information and store identity information as retrieval conditions; and
 a function to display merchandise information in a display of the terminal, when the merchandise information is received from the server through the network.

10. The program product according to claim 9, further realizing following functions in the portable communication terminal:
 a function to store purchaser identity information in the memory;
 a function to determine whether to accept purchase of merchandise displayed on the display, and
 a function to request a purchase processing from the server through the network by using purchased merchandise information including a price and merchandise information about the merchandise, and purchaser identity information and store identity information stored in the memory, as requirements, when purchase of merchandise is accepted.

* * * * *